United States Patent
Ikegami et al.

(10) Patent No.: US 8,250,874 B2
(45) Date of Patent: Aug. 28, 2012

(54) REFRIGERANT CYCLE DEVICE

(75) Inventors: Makoto Ikegami, Kariya (JP); Hiroshi Oshitani, Toyota (JP); Yoshiaki Takano, Kosai (JP)

(73) Assignee: Denso Corporation, Kariya (JP)

( * ) Notice: Subject to any disclaimer, the term of this patent is extended or adjusted under 35 U.S.C. 154(b) by 530 days.

(21) Appl. No.: 12/383,430

(22) Filed: Mar. 24, 2009

(65) Prior Publication Data

US 2009/0241573 A1 Oct. 1, 2009

(30) Foreign Application Priority Data

Mar. 27, 2008 (JP) ................. 2008-083218

(51) Int. Cl.
F25B 41/00 (2006.01)
(52) U.S. Cl. ............ 62/196.4; 62/159; 62/197; 62/198; 62/509; 62/525; 165/100; 165/103
(58) Field of Classification Search ............ 62/159, 62/196.4, 197, 198, 509, 524, 525; 165/100, 165/103
See application file for complete search history.

(56) References Cited

U.S. PATENT DOCUMENTS

| | | | |
|---|---|---|---|
| 4,483,156 A | 11/1984 | Oudenhoven | |
| 5,641,016 A | 6/1997 | Isaji et al. | |
| 5,988,267 A * | 11/1999 | Park et al. ............ | 165/110 |
| 6,470,703 B2 * | 10/2002 | Wada et al. ............ | 62/509 |
| 7,607,315 B2 | 10/2009 | Ohta | |
| 2002/0002841 A1* | 1/2002 | Izawa et al. ............ | 62/509 |
| 2003/0177783 A1* | 9/2003 | Yamasaki et al. ........ | 62/509 |
| 2004/0118150 A1* | 6/2004 | Yamada et al. .......... | 62/512 |
| 2006/0080985 A1 | 4/2006 | Inaba et al. | |

FOREIGN PATENT DOCUMENTS

| | | |
|---|---|---|
| JP | 2-56711 | 4/1990 |
| JP | 05-231748 | 9/1993 |
| JP | 08-197937 | 8/1996 |
| JP | 2001-108331 | 4/2001 |
| JP | 2004-232935 | 8/2004 |
| JP | 2004-361019 | 12/2004 |
| JP | 2005-306300 | 11/2005 |
| JP | 2005-351529 | 12/2005 |
| JP | 2006-118754 | 5/2006 |
| JP | 2007-024470 | 2/2007 |

OTHER PUBLICATIONS

Office Action dated Mar. 11, 2010 in CN Application No. 200910129688.2.
Office action dated Sep. 21, 2010 in corresponding Japanese Application No. 2008-083218.
Office Action dated May 18, 2010 in Japanese Application No. 2008-83218 with English translation thereof.

* cited by examiner

Primary Examiner — Frantz Jules
Assistant Examiner — Azim Abdur Rahim
(74) Attorney, Agent, or Firm — Harness, Dickey & Pierce, PLC

(57) ABSTRACT

A subcool condenser having a condensation heat exchange portion, a receive portion and a supercool heat exchange portion is used as an outdoor heat exchanger that functions as a radiator in a cooling operation mode so that COP in the cooling operation mode is increased. In contrast, in a heating operation mode, a refrigerant bypass device that causes the refrigerant to flow so as to bypass the supercool heat exchange portion is provided so that pressure loss generated in the refrigerant flowing through the outdoor heat exchanger is decreased. Thereby, driving force of a compressor can be decreased and COP in the heating operation mode can be improved.

8 Claims, 9 Drawing Sheets

REFRIGERANT CYCLE DEVICE

CROSS REFERENCE TO RELATED APPLICATION

The present application is based on Japanese Patent Application No. 2008-083218 filed on Mar. 27, 2008, the disclosure of which is incorporated herein by reference.

FIELD OF THE INVENTION

The present invention relates to a refrigerant cycle device configured to be capable of switching a cooling operation mode for cooling a fluid to be heat exchanged and a heating operation mode for heating a fluid to be heat exchanged.

BACKGROUND OF THE INVENTION

A conventional refrigerant cycle device is configured to be capable of switching a cooling operation mode for a fluid to be heat exchanged and a heating operation mode for heating a fluid to be heat exchanged.

For example, a refrigerant cycle device described in JP-A-2005-306300 is used for a vehicle air conditioner. The refrigerant cycle device includes a utilization side heat exchanger for exchanging heat between a refrigerant and air to be blown into a vehicle compartment as the fluid to be heat exchanged, an outdoor heat exchanger for exchanging heat between the refrigerant and ambient air, and a four-way valve as a flow passage switch portion for switching a refrigerant flow passage. The four-way valve switches the refrigerant flow passage so that both the cooling operation mode and the heating operation mode can be achieved.

More specifically, in the cooling operation mode for cooling the air to be blown into the vehicle compartment, the refrigerant flow passage is switched such that the utilization side heat exchanger functions as an evaporator for evaporating the refrigerant and the outdoor heat exchanger functions as a radiator for radiating heat of the refrigerant. In the heating operation mode for heating the air to be blown into the vehicle compartment, the refrigerant flow passage is switched such that the utilization side heat exchanger functions as the radiator and the outdoor heat exchanger functions as the evaporator.

In order to improve coefficient of performance, that is, COP, of a cycle by increasing refrigeration capacity of the refrigerant cycle device, a so-called subcool condenser can be used for the heat exchanger that functions as the radiator.

As described in JP-A-2001-108331, for example, the subcool condenser is a heat exchanger that includes a condensation heat exchange portion for condensing the refrigerant, a receive portion for separating the refrigerant flowing out of the condensation heat exchange portion into gas and liquid phases, and a supercool heat exchange portion for supercooling saturated liquid phase refrigerant flowing out of the receive portion. Thereby, enthalpy of the refrigerant that flows into the evaporator is decreased and refrigerant capacity obtained by the evaporator can be increased.

Therefore, in the refrigerant cycle device of JP-A-2005-306300, when the subcool condenser is used as the outdoor heat exchanger functioning as the radiator in the cooling operation mode, for example, refrigeration capacity obtained by the utilization side heat exchanger functioning as the evaporator can be increased and COP can be improved.

However, in the refrigerant cycle device, the outdoor heat exchanger is functioned as the evaporator in the heating operation mode, in which the utilization side heat exchanger is functioned as the radiator. Thus, when the subcool condenser is used as the outdoor heat exchanger in the heat operation mode, COP may be deteriorated.

The reason will be described in detail with reference to FIG. 9 and FIG. 10. FIG. 9 is a schematic diagram showing a whole configuration of a general refrigerant cycle device that is configured to be capable of switching the cooling operation mode and the heating operation mode. Hereinafter, the general refrigerant cycle device is referred to as a test refrigerant cycle device. The respective reference numerals shown in FIG. 9 correspond to respective elements in embodiments described below.

FIG. 10 is Mollier diagram showing a state of a refrigerant of the test refrigerant cycle device. The cooling operation mode is shown by a solid line and the heating operation mode is shown by a dashed line and a dashed-dotted line.

In the test refrigerant cycle device, as shown by the solid line, a four-way valve 41 as the flow passage switch portion switches to a refrigerant flow passage, in which the refrigerant is circulated through a compressor 21, an outdoor heat exchanger 28, a pressure reducing device 44, a utilization side heat exchanger 42 and the compressor 21 in this order in the cooling operation mode. In contrast, as shown by the dashed line, the four-way valve 41 switches to a refrigerant flow passage, in which the refrigerant is circulated through the compressor 21, the utilization side heat exchanger 42, the pressure reducing device 44, the outdoor heat exchanger 28 and the compressor 21 in this order in the heating operation mode.

In the test refrigerant cycle device, the subcool condenser having a condensation heat exchange portion 283a, a receive portion 286 and a supercool heat exchange portion 283b is used as the outdoor heat exchanger 28.

Therefore, in the cooling operation mode, as shown by the solid line in FIG. 10, supercool degree of the refrigerant flowing out of the outdoor heat exchanger 28 can be increased ($\Delta E$), and enthalpy difference between the enthalpy of the refrigerant at an inlet side and the enthalpy of the refrigerant at an outlet side in the utilization side heat exchanger 42, that is, refrigerant capacity in the utilization side heat exchanger 42, can be increased. As a result, COP in the cooling operation mode can be improved.

Because the subcool condenser functions to condense the refrigerant in the cooling operation mode, density of the refrigerant passing through the inside thereof increases gradually toward the outlet side from the inlet side of the subcool condenser. Thereby, a liquid phase refrigerant, the density of which is drastically increased compared to those of a gas phase refrigerant or a gas-liquid two-phase refrigerant, passes through the supercool heat exchange portion 283b.

Therefore, in the subcool condenser, the refrigerant passage area is decreased gradually toward the outlet side from the inlet side, and the refrigerant passage area of the supercool heat exchange portion 283b is set to be the smallest. Thereby, an appropriate heat exchange area can be obtained and performance as the condenser itself can be obtained. Furthermore, miniaturization of the whole subcool condenser can be achieved.

However, in the heating operation mode, the subcool condenser is used as the evaporator for evaporating the refrigerant, and the refrigerant flows from the outlet side to the inlet side of the condenser in case where the subcool condenser is used as the radiator, that is, the condenser. That is, the flow direction of the refrigerant flowing through the subcool condenser in the heating operation mode is inverted with respect to the flow direction of the refrigerant flowing through the subcool condenser in the cooling operation mode.

Therefore, the gas-liquid two-phase refrigerant flows into the supercool heat exchange portion 283b, the refrigerant passage of which becomes the smallest in the subcool condenser, in the heating operation mode. Thereby, as shown by the dashed line in FIG. 10, pressure loss in the outdoor heat exchanger 28 may be drastically increased with respect to the utilization side heat exchanger 42 in the cooling operation mode.

Such the increase of pressure loss may increase driving force of the compressor, and COP in the heating operation mode may be deteriorated.

Even if the flow direction of the refrigerant flowing through the subcool condenser in the heating operation mode is the same with the flow direction of the refrigerant flowing through the subcool condenser in the cooling operation mode with respect to the test refrigerant cycle device, the deterioration of COP due to the above-described increase of pressure loss may be generated.

The reason is as follows. Because the evaporator functions to evaporate the refrigerant, the density of the refrigerant passing through the inside thereof decreases gradually toward the outlet side from the inlet side. In contrast, in the subcool condenser, as described above, because the refrigerant passage area is gradually decreased toward the outlet side from the inlet side, pressure loss may be increased toward the outlet side from the inlet side as shown by the dashed-dotted line in FIG. 10.

SUMMARY OF THE INVENTION

In view of the above points, in a refrigerant cycle device configured to be capable of switching a cooling operation mode and a heating operation mode and using a subcool condenser, it is an object of the present invention to improve COP in both the operation modes.

According to one aspect of the present invention, a refrigerant cycle device includes a compressor configured to compress and discharge a refrigerant, a utilization side heat exchanger configured to exchange heat between the refrigerant and a fluid to be heat exchanged, an outdoor heat exchanger configured to exchange heat between the refrigerant and ambient air, and a flow passage switch portion configured to switch a refrigerant flow passage. The flow passage switch portion switches to a refrigerant flow passage in which heat of the refrigerant discharged from the compressor is radiated by the outdoor heat exchanger and the refrigerant evaporated by the utilization side heat exchanger flows into a refrigerant suction side of the compressor in a cooling operation mode for cooling the fluid, and switches to a refrigerant flow passage in which heat of the refrigerant discharged from the compressor is radiated by the utilization side heat exchanger and the refrigerant evaporated by the outdoor heat exchanger flows into the refrigerant suction side of the compressor in a heating operation mode for heating the fluid. The outdoor heat exchanger is configured to include a condensation heat exchange portion for condensing the refrigerant, a receive portion for separating the refrigerant flowing out of the condensation heat exchange portion into gas and liquid, and a supercool heat exchange portion for supercooling a saturated liquid phase refrigerant flowing out of the receive portion, through which the refrigerant flows in the cooling operation mode. The refrigerant cycle device further includes a refrigerant bypass portion that is configured such that the refrigerant bypasses at least a part of the supercool heat exchange portion in the heating operation mode.

Thereby, the outdoor heat exchanger is used as the subcool condenser in the cooling operation mode, in which the outdoor heat exchanger is functioned as the radiator, and COP in the cooling operation mode can be improved.

In the heating operation mode, in which the outdoor heat exchanger is functioned as the evaporator, the refrigerant bypass portion causes the refrigerant to flow so as to bypass at least a portion that is functioned as the supercool heat exchange portion in the cooling operation mode. Thus, pressure loss of the refrigerant generated when the refrigerant passes through the portion.

Therefore, in the heating operation mode, reduction of pressure of the refrigerant that is to be drawn into the compressor can be suppressed, and power consumption of the compressor can be reduced. As a result, COP in the heating operation mode can be improved. That is, COP in both operation modes, i.e., the cooling operation mode and the heating operation mode, can be improved.

For example, a flow direction of the refrigerant flowing through the outdoor heat exchanger in the cooling operation mode is the same with a flow direction of the refrigerant flowing through the outdoor heat exchanger in the heating operation mode, and the refrigerant bypass portion causes the refrigerant flowing into the condensation heat exchange portion to flow out of the receive portion in the heating operation mode.

Thereby, even when the cycle configuration, in which the flow direction of the refrigerant flowing through the outdoor heat exchanger in the cooling operation mode is the same with the flow direction of the refrigerant flowing through the outdoor heat exchanger in the heating operation mode, is used, COP in both operation modes can be improved.

Furthermore, the refrigerant bypass portion may include a bypass pipe through which the refrigerant flowing out of the receive portion flows, and a control valve for controlling a flowing state of the refrigerant flowing through the bypass pipe.

The meaning of "controlling a flowing state of the refrigerant" includes a flowing state and a shutoff state. The refrigerant flows through the bypass pipe in the flowing state, and the refrigerant in the bypass pipe is shut off in the shutoff state.

For example, the control valve includes a bypass pipe opening-closing valve for opening and closing the bypass pipe. Thereby, the flowing state of the refrigerant flowing through the bypass pipe can be easily controlled.

Moreover, the control valve may include a main pipe opening-closing valve for opening and closing a main pipe, and the main pipe opening-closing valve may be provided in the main pipe between an end portion of the bypass pipe that is opposite from another end portion thereof connected to the receive portion and the supercool heat exchange portion.

Thereby, it can prevent the refrigerant from flowing into the supercool heat exchanger using the main pipe between the end portion of the bypass pipe that is opposite from another end portion thereof connected to the receive portion and the supercool heat exchange portion in the heat operation mode.

For example, a flow direction of the refrigerant flowing through the outdoor heat exchanger in the cooling operation mode is opposite from a flow direction of the refrigerant flowing through the outdoor heat exchanger in the heating operation mode, and the refrigerant bypass portion causes the refrigerant to flow into the receive portion and causes the refrigerant flowing into the receive portion to flow out of the condensation heat exchange portion in the heating operation mode.

Thereby, even when the cycle configuration, in which the flow direction of the refrigerant flowing through the outdoor heat exchanger in the cooling operation mode is opposite from the flow direction of the refrigerant flowing through the outdoor heat exchanger in the heating operation mode, is used, COP in both operation modes can be improved.

Furthermore, the refrigerant bypass portion may include a bypass pipe through which the refrigerant flows into the receive portion, and a control valve for controlling a flowing state of the refrigerant flowing through the bypass pipe.

For example, the control valve may include a bypass pipe opening-closing valve for opening and closing the bypass pipe. Alternatively, the control valve may include a check valve that allows the refrigerant flowing through the bypass pipe to flow only toward the receive portion. Thereby, the flowing state of the refrigerant flowing through the bypass pipe can be easily controlled.

In addition, the control valve may include a main pipe opening-closing valve for opening and closing a main pipe, and the main pipe opening-closing valve may be provided in the main pipe between an end portion of the bypass pipe that is opposite from another end portion thereof connected to the receive portion and the supercool heat exchange portion.

Thereby, it can prevent the refrigerant from flowing into the supercool heat exchanger using the main pipe between the end portion of the bypass pipe that is opposite from another end portion thereof connected to the receive portion and the supercool heat exchange portion in the heat operation mode.

Furthermore, at least a part of the refrigerant bypass portion may be provided along an outer surface of the outdoor heat exchanger or may be configured integrally with a configuring member of the outdoor heat exchanger. Thereby, miniaturization and mounting capability of the outdoor heat exchanger and the refrigerant bypass portion can be improved.

Alternatively, at least a part of the refrigerant bypass portion may be configured integrally with the outdoor heat exchanger such that a temperature change of the refrigerant passing through the refrigerant bypass portion is suppressed.

Thereby, the refrigerant flowing through the refrigerant bypass portion can be suppressed to be heated due to the environmental temperature, in which the refrigerant bypass portion is provided, and pressure loss generated in the refrigerant flowing through the refrigerant bypass portion can be decreased. Therefore, COP in the heating operation mode can be further improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
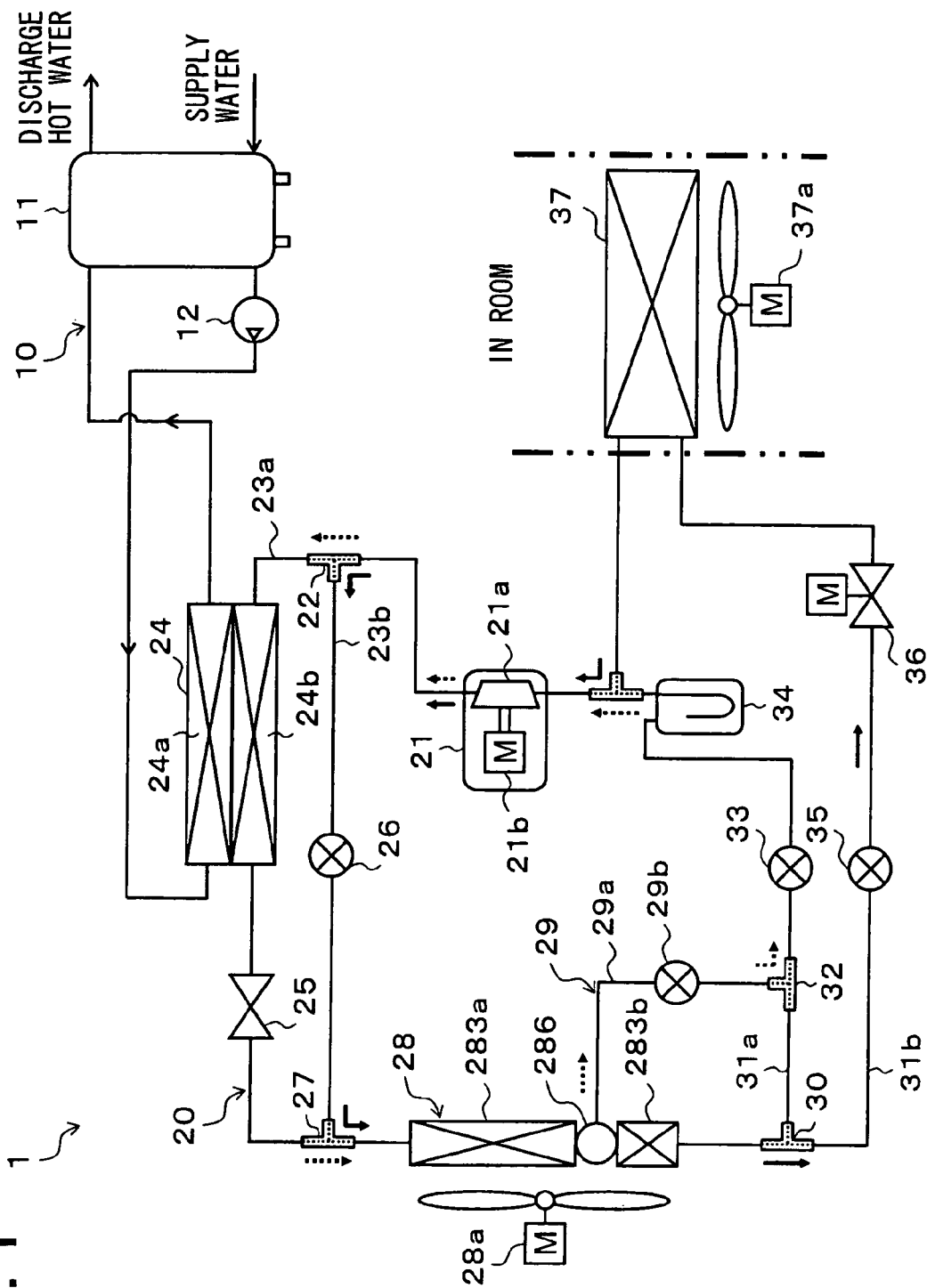
FIG. 1 is a schematic diagram showing a whole configuration of a refrigerant cycle device with a cooling operation mode and a heating operation mode according to a first embodiment.

A first embodiment of the present invention will be described with reference to FIG. 1 and FIG. 2. In the present embodiment, a refrigerant cycle device 1 of the present invention is used for a room air conditioner and a water heater in a dwelling-house or the like. FIG. 1 is a schematic diagram showing a whole configuration of the refrigerant cycle device 1. In FIG. 1, solid arrows show a refrigerant flow in an air conditioner operation mode described below, and dashed arrows show the refrigerant flow in a hot water operation mode described below.

As shown in FIG. 1, the refrigerant cycle device 1 includes a water circuit 10, in which water stored in a hot water tank 11 is circulated, and a vapor compression refrigerant cycle 20 configured to be capable of switching a cooling operation mode, i.e., the air conditioner operation mode, for cooling a fluid to be heat exchanged and a heating operation mode, i.e., the hot water operation mode, for heating a fluid to be heat exchanged.

The hot water tank 11 connected to the water circuit 10 is a tank having a heat-insulated structure for keeping the hot water warm for a long time, and is made of high-corrosion resistance metal such as stainless material.

The water stored in the hot water tank 11 flows out of an outlet port provided at an upper portion of the hot water tank 11. The water is mixed with tap water from water supply by using a temperature control valve, which is not shown in the drawing, so that the water temperature is adjusted, and then, the adjusted water is supplied to a kitchen, a bathroom or the like. In addition, tap water is supplied from an inlet port provided at a lower portion of the hot water tank 11.

An electric water pump 12 for circulating the water is provided in the water circuit 10. The operation of the electric water pump 12 is controlled by control signals output from a control device, which is not shown in the drawing. When the electric water pump 12 is operated by the control device, the water is circulated through the electric water pump 12, a water passage 24a of a water-refrigerant heat exchanger 24 described below, the hot water tank 11 and the electric water pump 12 in this order.

The refrigerant cycle 20 includes a compressor 21, the water-refrigerant heat exchanger 24 and an evaporator 37 as utilization side heat exchangers, a fixed throttle 25, an outdoor heat exchanger 28, an expansion valve 36, flow passage switch portions such as a first solenoid valve 26, a second solenoid valve 33, a third solenoid valve 35 and the like.

In the refrigerant cycle 20, ordinary fluorocarbon refrigerant is used as the refrigerant. The refrigerant cycle 20 configures a subcritical refrigerant cycle, in which the refrigerant pressure at a high pressure side does not excess the critical pressure of the refrigerant. In addition, refrigerant oil for lubricating the compressor 21 is mixed in the refrigerant, and the refrigerant oil is circulated with the refrigerant in the cycle.

In the refrigerant cycle 20, the compressor 21 draws the refrigerant and compresses the drawn refrigerant to discharge. The compressor 21 is an electric compressor in which a fixed capacity type compression portion 21a configured to have a fixed discharge capacity is driven by an electric motor 21b. Specifically, various compression mechanisms such as a scroll-type compression mechanism and a vane type compression mechanism can be used as the fixed capacity type compression portion 21a.

Rotation frequency of the electric motor 21b is controlled by the control signals output from the control device. An alternating-current motor or a direct-current motor may be used for the electric motor 21b. Refrigerant discharge ability of the compressor 21 is changed by the rotation frequency control. Therefore, the electric motor 21b configures a discharge ability change portion of the compressor 21.

A discharge side of the compressor 21 is connected to a first branch portion 22 for separating the flow direction of the refrigerant discharged from the compressor 21 into two streams. The first branch portion 22 is configured by a three-way joint having three opening portions. One of the opening portions is a refrigerant inlet portion and two of the opening portions are refrigerant outlet portions. In order to form the three-way joint, pipes having different diameters may be jointed or a plurality of refrigerant passages having different diameters may be provided in a metal block or a resin block.

One of the refrigerant outlet portions in the first branch portion 22 is connected to an inlet side of a refrigerant passage 24b of the water-refrigerant heat exchanger 24 via a first refrigerant pipe 23a. The water-refrigerant heat exchanger 24 is the utilization side heat exchanger configured by the water passage 24a, in which the water flows, and the refrigerant passage 24b, in which the high temperature and high pressure refrigerant discharged from the compressor 21 flows. The water-refrigerant heat exchanger 24 functions as a radiator such that heat quantity of the refrigerant discharged from the compressor 21 is radiated to the water in the hot water operation mode.

Therefore, the water is the fluid to be heat exchanged in the hot water operation mode of the present embodiment. Furthermore, the flow direction of the water in the water passage 24a of the water-refrigerant heat exchanger 24 and the flow direction of the refrigerant in the refrigerant passage 24b of the water-refrigerant heat exchanger 24 are opposite to each other. Thereby, temperature difference between the water flowing in the water passage 24a and the refrigerant flowing in the refrigerant passage 24b is ensured so that heat exchange efficiency is improved.

The fixed throttle 25 is connected to an outlet side of the refrigerant passage 24b of the water-refrigerant heat exchanger 24. The fixed throttle 25 is a first depressurizing portion for depressurizing and expanding the refrigerant discharged from the refrigerant passage 24b in the hot water operation mode. A capillary tube, an orifice and the like can be used for the fixed throttle 25.

In contrast, another refrigerant outlet portion in the first branch portion 22 is connected to the first solenoid valve 26 via a second refrigerant pipe 23b. The first solenoid valve 26 is the flow passage switch portion for switching a refrigerant flow passage by opening and closing the second refrigerant pipe 23b. The operation of the first solenoid valve 26 is controlled by the control signals output from the control device.

When the control device causes the first solenoid valve 26 to be closed, all of the refrigerant flowing into the first branch portion 22 flows into the first refrigerant pipe 23a. When the control device causes the first solenoid valve 26 to be opened, almost all of the refrigerant flowing into the first branch portion 22 flows into the second refrigerant pipe 23b that has a lower pressure loss than the first refrigerant pipe 23a.

Refrigerant outlet sides of the fixed throttle 25 and the first solenoid valve 26 are connected to refrigerant inlet portions of a first confluence portion 27, respectively. A basic configuration of the first confluence portion 27 is the same as that of the first branch portion 22. That is, in the first confluence portion 27, two of three opening portions are used as refrigerant inlet portions, and one of the three opening portions is used as a refrigerant outlet portion.

The refrigerant outlet portion of the first confluence portion 27 is connected to an inlet portion 285a of a condensation heat exchange portion 283a of the outdoor heat exchanger 28. The outdoor heat exchanger 28 is provided outside the room, and exchanges heat between the refrigerant flowing inside the outdoor heat exchanger 28 and ambient air sent by a blower fan 28a. The blower fan 28a is an electric blower fan and the rotation frequency, i.e., the amount of blowing air, is controlled by the control voltage output from the control device.

Details of the outdoor heat exchanger 28 will be described with reference to FIG. 2. FIG. 2 is a schematic cross-sectional view of the outdoor heat exchanger 28. In FIG. 2, a solid arrow shows the flow of the refrigerant in the air conditioner operation mode, and a dashed arrow shows the flow of the refrigerant in the hot water operation mode. An arrow showing an up-down direction is a direction of the outdoor heat exchanger 28 when being mounted to the refrigerant cycle device 1.

Figure 2:
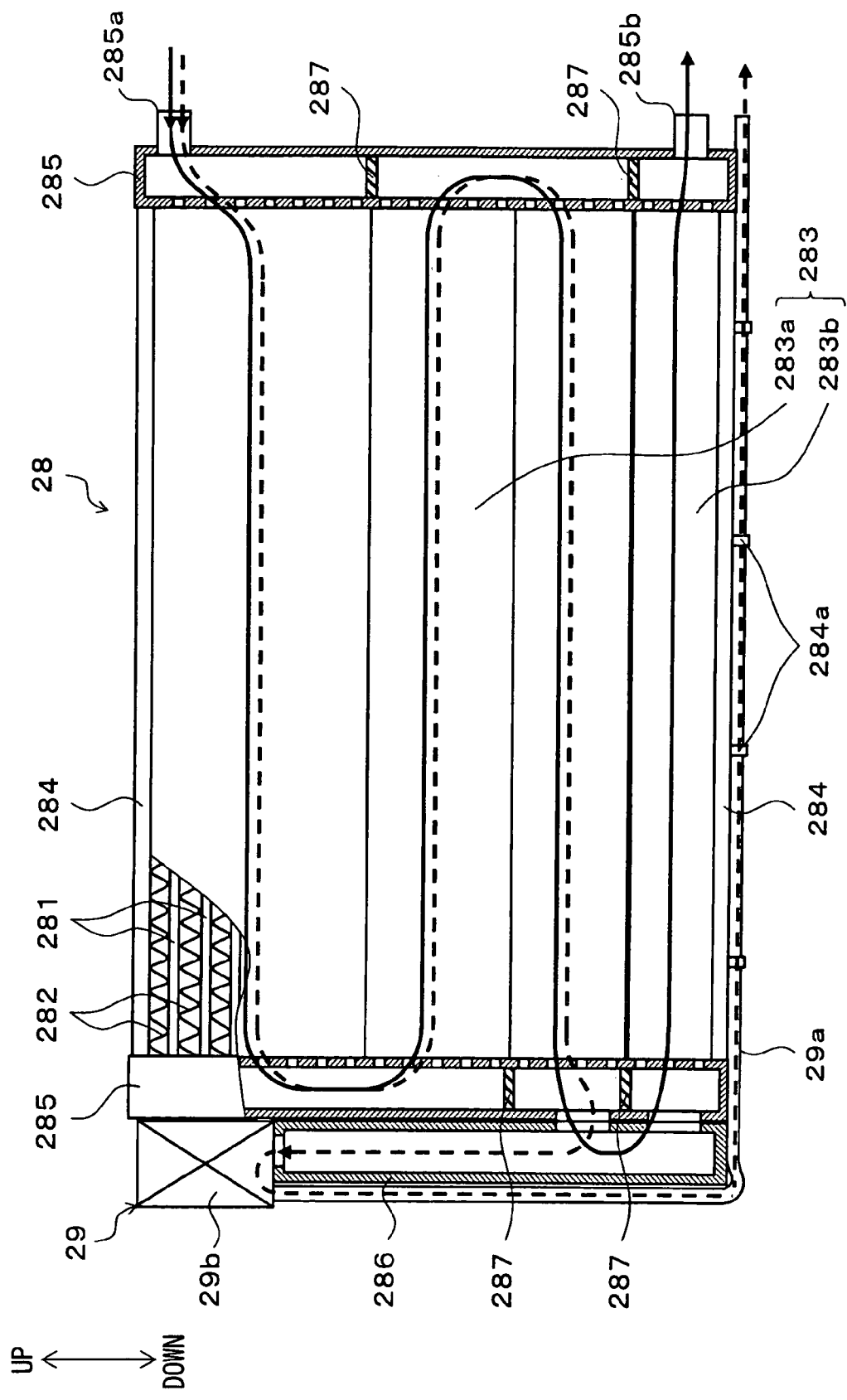
FIG. 2 is a cross-sectional view showing an outdoor heat exchanger according to the first embodiment.

As shown in FIG. 2, in the outdoor heat exchanger 28, a plurality of tubes 281, inside of which the refrigerant flows, are laminated and fins 282 for promoting heat exchange between the refrigerant and air are provided between the respective adjacent tubes 281. As the tube 281, a flat tube having therein a single hole or multiple holes, which is formed by molding or the like, can be used. In addition, as the fin 282, a corrugated fin that is folded in a wavelike fashion can be used.

A heat exchange core portion 283 having a substantially rectangular shape is configured by the laminated structure of the tubes 281 and the fins 282. Side plates 284, which are reinforcing members for reinforcing the heat exchange core portion 283, are provided at both sides of the heat exchange core portion 283 in the laminate direction of the tubes 281 and the fins 282. The side plates 284 extend in parallel with the tubes 281.

A pair of header tanks 285 for distributing the refrigerant into the tubes 281 and joining the refrigerant from the tubes 281 is connected to both sides of the tubes 281 in the longitudinal direction of the tubes 281. The header tanks 285 are provided to extend in the laminate direction of the tubes 281. A plurality of slits, number of which is equal to that of the tubes 281, are formed at the respective header tanks 285, and the respective header tanks 285 are connected to all the tubes 281 through the slits.

The inlet portion 285a that introduces the refrigerant flowing out of the first confluence portion 27 and an outlet portion 285b that causes the refrigerant to flow out are provided at one of the header tanks 285. A receive portion 286, i.e., a modulator portion for separating gas and liquid of the refrigerant and storing surplus refrigerant is provided adjacent to another header tank 285 so that the modulator portion 286 communicates with an inside of another header tank 285.

A plurality of separators 287 for separating an internal space of the respective header tanks 285 are provided in each of the header tanks 285. By using the plurality of separators 287, the refrigerant flowing from the inlet portion 285a flows windingly in the heat exchange core portion 283 as shown by the arrow, and the heat exchange core portion 283 is separated into two heat exchange portions.

The heat exchange portion, which is located at a side of the inlet portion 285a, of the two heat exchange portions configures the condensation heat exchange portion 283a that condenses the refrigerant by exchanging heat between the refrigerant flowing from the inlet portion 285a and the ambient air sent by the blower fan 28a in the air conditioner operation mode. The refrigerant flowing out of the condensation heat exchange portion 283a flows into the receive portion 286 through another header tank 285.

The heat exchange portion, which is located at a side of the outlet portion 285b, configures a supercool heat exchange portion 283b that supercools the refrigerant by exchanging heat between the saturated liquid phase refrigerant flowing out of the receive portion 286 and the ambient air sent by the blower fan 28a in the air conditioner operation mode. The refrigerant having passed through the supercool heat exchange portion 283b flows out of the outlet portion 285b.

Therefore, the outdoor heat exchanger 28 of the present embodiment is a so-called supercool heat exchanger having the condensation heat exchange portion 283a, the receive portion 286 and the supercool heat exchange portion 283b. The outdoor heat exchanger 28 is configured such that the condensation heat exchange portion 283a condenses the refrigerant, the receive portion 286 separates gas and liquid phases of the refrigerant flowing out of the condensation heat exchange portion 283a and the supercool heat exchange portion 283b supercools the saturated liquid phase refrigerant flowing out of the receive portion 286 in the air conditioner operation mode.

In addition, because the outdoor heat exchanger 28 functions to condense the refrigerant in the air conditioner operation mode, density of the refrigerant passing through the inside of the outdoor heat exchanger 28 increases gradually toward the outlet portion 285b from the inlet portion 285a. Therefore, in the present embodiment, as shown in FIG. 2, the separators 287 are provided such that the refrigerant passage area is decreased gradually toward the outlet portion 285b from the inlet portion 285a.

Furthermore, the outdoor heat exchanger 28 of the present embodiment is connected to a refrigerant bypass device 29. The refrigerant bypass device 29 is configured such that the refrigerant bypasses the supercool heat exchange portion 283b in the hot water operation mode. The refrigerant bypass device 29 is configured by a bypass pipe 29a through which the refrigerant flowing out of the receive portion 286 directly flows without passing through the supercool heat exchange portion 283b, and a bypass pipe opening-closing valve 29b that is a control valve for controlling the flowing state of the refrigerant that flows through the bypass pipe 29a.

The bypass pipe 29a is a refrigerant pipe that is connected to a communicating hole provided at an uppermost portion of the receive portion 286 via the bypass pipe opening-closing valve 29b and extends along the receive portion 286 and the side plate 284 at the bottom surface side of the supercool heat exchange portion 283b. Furthermore, the bypass pipe 29a is fixed by a fixing claw portion 284a provided at the side plate 284 at the bottom surface side of the supercool heat exchange portion 283b so that the bypass pipe 29a is combined integrally with the outdoor heat exchanger 28.

The bypass pipe opening-closing valve 29b is a solenoid valve for opening and closing the bypass pipe 29a, and the operation of the bypass pipe opening-closing valve 29b is controlled by the control voltage output from the control device. The refrigerant passage area of the bypass pipe 29a and the bypass pipe opening-closing valve 29b are set such that pressure loss generated in the refrigerant flowing in the bypass pipe 29a when the bypass pipe opening-closing valve 29b is opened becomes sufficiently lower than pressure loss generated in the refrigerant flowing in the supercool heat exchange portion 283b.

As shown in FIG. 1, the outlet portion 285b of the outdoor heat exchanger 28 is connected to a second branch portion 30 for separating the flow direction of the refrigerant discharged from the outdoor heat exchanger 28 into two streams. A basic configuration of the second branch portion 30 is the same as that of the first branch portion 22.

One of the refrigerant outlet portions in the second branch portion 30 is connected to one of refrigerant inlet portions of a second confluence portion 32 via a third refrigerant pipe 31a. A basic configuration of the second confluence portion 32 is the same as that of the first confluence portion 27. The other refrigerant inlet portion of the second confluence portion 32 is connected to the bypass pipe 29a of the refrigerant bypass device 29.

Furthermore, a refrigerant outlet portion of the second confluence portion 32 is connected to the second solenoid valve 33 that has the same configuration with the first solenoid valve 26. The second solenoid valve 33 is the flow passage switch portion for switching the refrigerant flow passage by opening and closing the third refrigerant pipe 31a.

A refrigerant outlet side of the second solenoid valve 33 is connected to an accumulator 34. The accumulator 34 is a low pressure side gas-liquid separator that separates gas and liquid phases of the refrigerant having passed through the second solenoid valve 33, and stores therein the surplus refrigerant. A gas phase refrigerant outlet portion of the accumulator 34 is connected to a suction portion of the compressor 21.

In contrast, the other refrigerant outlet portion in the second branch portion 30 is connected to the third solenoid valve 35 via a fourth refrigerant pipe 31b. The fourth refrigerant pipe 31b has the same configuration with the first solenoid valve 26 and the second solenoid valve 33. The third solenoid valve 35 is the flow passage switch portion for switching the refrigerant flow passage by opening and closing the fourth refrigerant pipe 31b.

A refrigerant outlet side of the third solenoid valve 35 is connected to an electric expansion valve 36. The electric expansion valve 36 is a second depressurizing portion for depressurizing and expanding the refrigerant having passed through the third solenoid valve 35 by changing the throttle opening degree, and is a flow amount adjust portion for adjusting the flow amount of the refrigerant flowing to the downstream of the electric expansion valve 36.

More specifically, the electric expansion valve 36 is configured by an electric actuator mechanism made from a step motor and a valve mechanism driven by the electric actuator mechanism. The throttle opening degree can be adjusted finely by an operating angle of the electric actuator mechanism.

A refrigerant outlet side of the electric expansion valve 36 is connected to the evaporator 37 provided in the room. The evaporator 37 is the utilization side heat exchanger functioning as an endothermic heat exchanger for evaporating the low pressure refrigerant to show the endothermic function by exchanging heat between the low pressure refrigerant depressurized and expanded by the electric expansion valve 36 and the indoor blowing air sent by a blower fan 37a in the air conditioner operation mode.

Therefore, in the air conditioner operation mode of the present embodiment, the indoor blowing air is the fluid to be heat exchanged. The blower fan 37a is provided in the room with the evaporator 37. The blower fan 37a is an electric blower fan and the rotation frequency, i.e., the amount of blowing air, is controlled by the control voltage output from the control device. Furthermore, a refrigerant outlet side of the evaporator 37 is connected to a refrigerant inlet side of the compressor 21.

Next, an outline of an electric control portion of the present embodiment will be described. The control device is configured by a microcomputer, a peripheral circuit thereof and the like. An output side of the control device is connected to the electric water pump 12 of the water circuit 10, the electric motor 21b of the compressor 21, the bypass pipe opening-closing valve 29b of the refrigerant bypass device 29, the first solenoid valve 26, the second solenoid valve 33, the third solenoid valve 35, the electric expansion valve 36 and the like. The control device controls operations of the components.

In addition, an input side of the control device is connected to a water temperature sensor for detecting temperature of the water flowing out of the water passage 24a of the water-refrigerant heat exchanger 24, a refrigerant temperature sensor for detecting temperature of the refrigerant flowing out of the evaporator 37, a refrigerant pressure sensor for detecting pressure of the refrigerant flowing from the evaporator 37, an ambient temperature sensor for detecting ambient temperature, a room temperature sensor for detecting room temperature and the like. Detection signals of the sensors are input into the control device.

Furthermore, the input side of the control device is connected to an operation panel, which is not shown in the drawing. An actuation switch of the refrigerant cycle device 1, a selection switch of the air conditioner operation mode and the hot water operation mode, a room temperature setting switch of the room temperature, a water temperature setting switch of the water heater and the like are provided in the operation panel. Operation signals thereof are input into the control device.

Next, the operation of the present embodiment in the above configuration will be described. As described above, in the refrigerant cycle device 1 of the present embodiment, the two operation modes such as the air conditioner operation mode for cooling the indoor blowing air and the hot water operation mode for heating the water can be switched.

A. Air Conditioner Operation Mode (Cooling Operation Mode)

When the air conditioner operation mode is selected by the selection switch in the state where the actuation switch of the refrigerant cycle device 1 in the operation panel is turned on, the air conditioner operation mode is performed. In the air conditioner operation mode, the control device stops the electric water pump 12 of the water circuit 10, opens the first solenoid valve 26 and the third solenoid valve 35, and closes the second solenoid valve 33 and the bypass pipe opening-closing valve 29b.

Therefore, almost all of the refrigerant flowing into the first branch portion 22 flows into the second refrigerant pipe 23b that has a lower pressure loss than the first refrigerant pipe 23a. Furthermore, in response to the detection signals of the above sensors, the control device rotates the electric motor 21b of the compressor 21 and changes the throttle opening degree of the electric expansion valve 36.

More specifically, the control device controls the rotation frequency of the electric motor 21b in response to the detection values of the refrigerant temperature sensor, the ambient temperature sensor and the room temperature sensor and a target temperature of the indoor blowing air calculated from the setting temperature of the room temperature setting switch, and controls the throttle opening degree of the electric expansion valve 36 based on the detection values of the refrigerant temperature sensor and the refrigerant pressure sensor such that superheat degree of the refrigerant flowing out of the evaporator 37 is within a predetermined range.

Thereby, as shown in the solid arrows in FIG. 1, the vapor compression refrigerant cycle is configured such that the refrigerant circulates through the compressor 21, the first branch portion 22, the first solenoid valve 26, the first confluence portion 27, the condensation heat exchange portion 283a of the outdoor heat exchanger 28, the receive portion 286, the supercool heat exchange portion 283b, the second branch portion 30, the third solenoid valve 35, the electric expansion valve 36, the evaporator 37 and the compressor 21 in this order.

Therefore, the refrigerant compressed by the compressor 21 is cooled by exchanging heat with the ambient air at the outdoor heat exchanger 28, and is depressurized and expanded by the electric expansion valve 36. Furthermore, the low pressure refrigerant depressurized by the electric expansion valve 36 flows into the evaporator 37, and absorbs heat from the air blown into the room by the blower fan 37a to evaporate. Thereby, the indoor blowing air is cooled. The refrigerant flowing out of the evaporator 37 is drawn into the compressor 21 and compressed again.

In the air conditioner operation mode of the present embodiment, the refrigerant can pass through the condensation heat exchange portion 283a, the receive portion 286 and the supercool heat exchange portion 283b in this order while passing through the outdoor heat exchanger 28. Thereby, enthalpy of the refrigerant that flows into the evaporator 37 can be decreased and refrigeration capacity by the evaporator 37 can be increased. Therefore, COP of the cycle can be improved.

B. Hot Water Operation Mode (Heating Operation Mode)

When the hot water operation mode is selected by the selection switch in the state where the actuation switch of the refrigerant cycle device 1 in the operation panel is turned on, the hot water operation mode is performed. In the hot water operation mode, the control device closes the first solenoid valve 26 and the third solenoid valve 35, and opens the bypass pipe opening-closing valve 29b and the second solenoid valve 33.

Therefore, almost all of the refrigerant flowing into the receive portion 286 from the condensation heat exchange portion 283a of the outdoor heat exchanger 28 flows into the bypass pipe 29a of the refrigerant bypass device 29 that has a lower pressure loss than the supercool heat exchange portion 283b.

Furthermore, in response to the detection signals of the above sensors, the control device rotates the electric motor 21b of the compressor 21 and actuates the electric water pump 12 of the water circuit 10. More specifically, the control device controls the actuation of the electric water pump 12 such that the detection value of the water temperature sensor approaches the setting temperature of the water temperature setting switch.

Thereby, as shown in the dashed arrows in FIG. 1, the vapor compression refrigerant cycle is configured such that the refrigerant circulates through the compressor 21, the first branch portion 22, the water-refrigerant heat exchanger 24, the fixed throttle 25, the first confluence portion 27, the condensation heat exchange portion 283a of the outdoor heat exchanger 28, the receive portion 286, the bypass pipe 29a, the second confluence portion 32, the second solenoid valve 33, the accumulator 34 and the compressor 21 in this order.

Therefore, the refrigerant compressed by the compressor 21 exchanges heat with the water in the water-refrigerant heat exchanger 24 to radiate heat. Thereby, the water is heated. The refrigerant flowing put of the refrigerant passage 24b of the water-refrigerant heat exchanger 24 is depressurized and expanded by the fixed throttle 25, flows into the condensation heat exchange portion 283a of the outdoor heat exchanger 28, and absorbs heat from the blow air by the blower fan 28a.

The refrigerant flowing into the receive portion 286 from the condensation heat exchange portion 283a of the outdoor heat exchanger 28 flows into the accumulator 34 via the bypass pipe 29a. Furthermore, the gas phase refrigerant separated from the liquid phase refrigerant in the accumulator 34 is drawn into the compressor 21 and compressed again.

In the hot water operation mode of the present embodiment, the refrigerant flowing into the outdoor heat exchanger 28 passes through the condensation heat exchange portion 283a, the receive portion 286 and the bypass pipe 29a in this order. Thereby, pressure loss generated when the refrigerant passes through the outdoor heat exchanger 28 can be drastically decreased compared to the case where the refrigerant passes through the condensation heat exchange portion 283a, the receive portion 286 and the supercool heat exchange portion 283b.

Thus, reduction of pressure of the refrigerant that is to be drawn into the compressor 21 can be suppressed, and power consumption of the compressor 21 can be reduced. Therefore, COP can be improved.

As described above, according to the present embodiment, the refrigerant cycle device is configured to be capable of switching the cooling operation mode and the heating operation mode. Moreover, in the refrigerant cycle device using the subcool condenser, even if the cycle configuration that the flow direction of the refrigerant flowing through the outdoor heat exchanger 28 in the cooling operation mode becomes the same with the flow direction of the refrigerant flowing through the outdoor heat exchanger 28 in the heating operation mode is used, COP in both operation modes can be improved.

Furthermore, in the present embodiment, the bypass pipe 29a of the refrigerant bypass device 29 is integrally combined with the outdoor heat exchanger 28. Thereby, miniaturization and mounting capability of the outdoor heat exchanger 28 and the refrigerant bypass device 29 can be improved.

In addition, by configuring the bypass pipe 29a and the outdoor heat exchanger 28 integrally, heating of the refrigerant passing through the bypass pipe 29a due to temperature of an environment, in which the refrigerant bypass device 29 is provided, can be suppressed. Thereby, pressure loss due to volume expansion of the refrigerant passing through the bypass pipe 29a can be reduced. Therefore, COP in the heating operation mode can be further improved.

Second Embodiment

Figure 3:
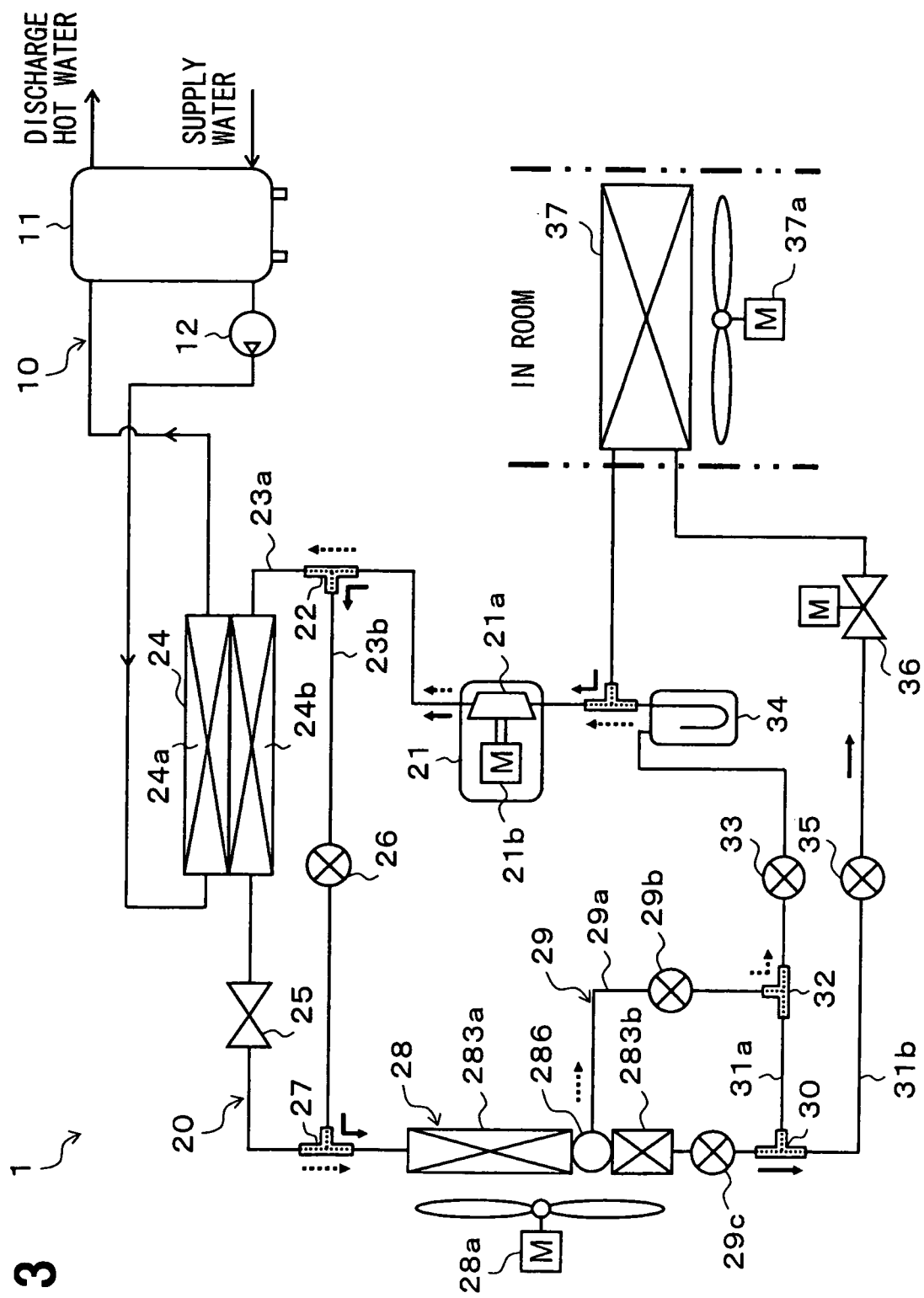
FIG. 3 is a schematic diagram showing a whole configuration of a refrigerant cycle device with a cooling operation mode and a heating operation mode according to a second embodiment.

In the present embodiment, as shown in the whole configuration diagram of FIG. 3, a main pipe opening-closing valve 29c as a control valve for the refrigerant bypass device 29 is added with respect to the refrigerant cycle device 1 of the first embodiment. In the embodiments following the present embodiment, the same reference numeral is indicated for a portion which is the same with or equivalent to the portion described in the first embodiment, and the description thereof is skipped.

The main pipe opening-closing valve 29c is provided in a main pipe between an end portion of the bypass pipe 29a at a side of the second confluence portion 32 and the supercool heat exchange portion 283b, that is, in the main pipe connected between the second confluence portion 32 and the supercool heat exchange portion 283b, and is a solenoid valve for opening and closing the main pipe. Furthermore, the operation of the main pipe opening-closing valve 29c is controlled by the control voltage output from the control device.

More specifically, the main pipe opening-closing valve 29c of the present embodiment is provided in a pipe connected between the second branch portion 30 and the supercool heat exchange portion 283b in the main pipe. Moreover, the control device causes the main pipe opening-closing valve 29c to be opened in the air conditioner operation mode, and causes the main pipe opening-closing valve 29c to be closed in the hot water operation mode. Therefore, the operation in the air conditioner operation mode of the present embodiment becomes similar to that of the first embodiment.

In contrast, because the main pipe opening-closing valve 29c is closed in the hot water operation mode, all of the refrigerant flowing into the receive portion 286 from the condensation heat exchange portion 283a of the outdoor heat exchanger 28 flows into the bypass pipe 29a.

Therefore, in the present embodiment, the similar effect with the first embodiment can be obtained. In addition, the refrigerant can be prevented absolutely from flowing into the supercool heat exchange portion 283b in the hot water operation mode. Thereby, a phenomenon that the refrigerant accumulates in the supercool heat exchange portion 283b, i.e., oil staying phenomenon, or a lubricating defective of the compressor 21 by accumulating the refrigerant oil in the supercool heat exchange portion 283b can be prevented.

Third Embodiment

Figure 4:
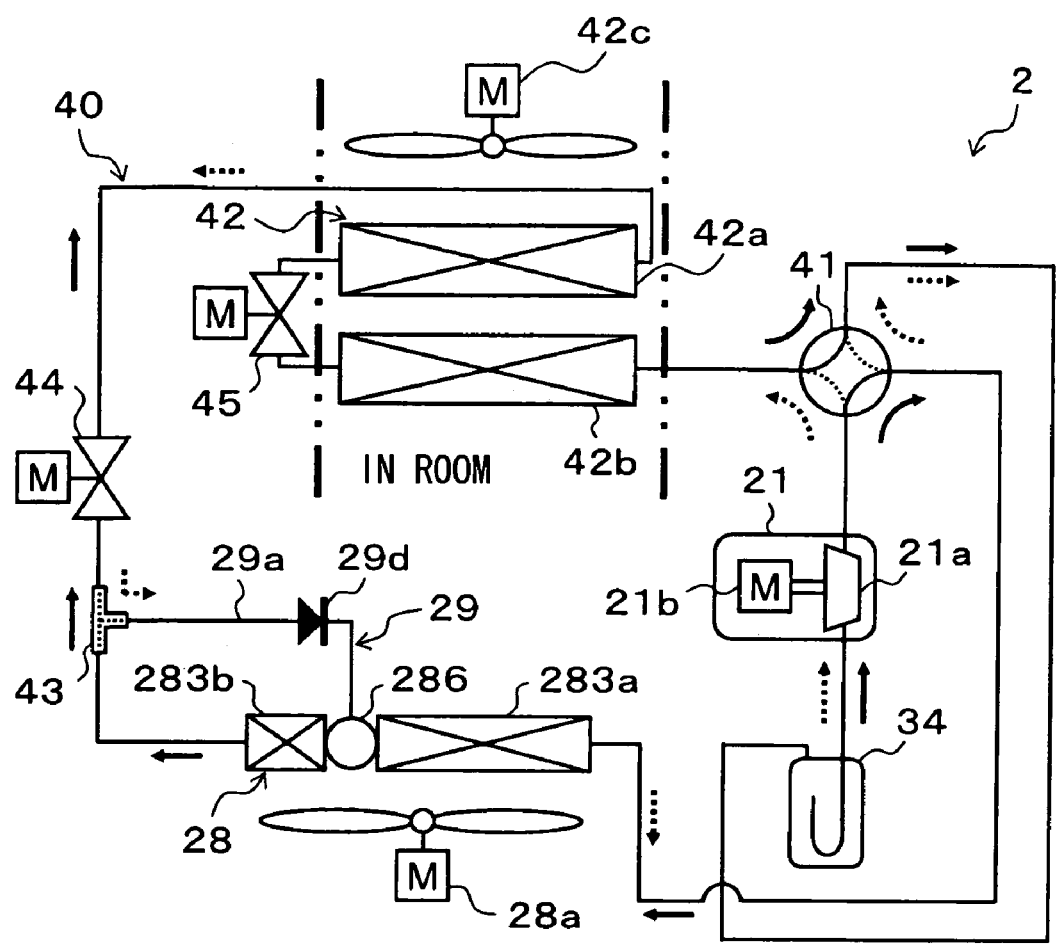
FIG. 4 is a schematic diagram showing a whole configuration of a refrigerant cycle device used as an air conditioner according to a third embodiment.

Next, a third embodiment of the present invention will be described with reference to FIG. 4 and FIG. 5. In the present embodiment, a refrigerant cycle device 2 of the present invention is used for an air conditioning device for a room air conditioner. FIG. 4 is a schematic diagram showing a whole configuration of the refrigerant cycle device 2. In FIG. 4, solid arrows show a refrigerant flow in a cooling operation mode described below, and dashed arrows show the refrigerant flow in a dehumidification operation mode and a heating operation mode, which are described below.

The refrigerant cycle device 2 includes a vapor compression refrigerant cycle 40, which is configured to be capable of switching the cooling operation mode for cooling an indoor blowing air that is a fluid to be heat exchanged, and the heating operation mode or the dehumidification operation mode for heating the indoor blowing air and the like.

In the refrigerant cycle 40, a refrigerant discharge side of the compressor 21 is connected to an electric four-way valve 41. The electric four-way valve 41 is a flow passage switch portion, and the operation of the electric four-way valve 41 is controlled by the control signals output from the control device.

Specifically, the electric four-way valve 41 switches a flow circuit shown by the solid arrows in FIG. 4 and a flow circuit shown by the dashed arrows in FIG. 4. The flow circuit shown by the solid arrows is a refrigerant flow passage that connects the discharge side of the compressor 21 to the condensation heat exchange portion 283a of the outdoor heat exchanger 28 and connects a second heat exchange portion 42b of a utilization side heat exchanger 42 described below to the accumulator 34 at the same time. The flow circuit shown by the dashed arrows is a refrigerant flow passage that connects the discharge side of the compressor 21 to the second heat exchange portion 42b and connects the condensation heat exchange portion 283a to the accumulator 34 at the same time.

As the refrigerant flow passage shown by the solid arrows in FIG. 4, the discharge side of the compressor 21 is connected to the condensation heat exchange portion 283a of the outdoor heat exchanger 28 via the electric four-way valve 41 in the cooling operation mode. A basic configuration of the outdoor heat exchanger 28 is the same as described in the first embodiment. The outdoor heat exchanger 28 is connected to a refrigerant bypass device 29 as in the first embodiment.

In the refrigerant cycle 40, as described below, a flow direction of the refrigerant flowing through the outdoor heat exchanger 28 in the cooling operation mode is opposite from a flow direction of the refrigerant flowing through the outdoor heat exchanger 28 in the dehumidification operation mode and the heating operation mode. Therefore, a bypass pipe 29a of the refrigerant bypass device 29 can function for the refrigerant to directly flow into the receive portion 286 from a three-way joint 43, which is described below, without passing through the supercool heat exchange portion 283b.

Furthermore, in the present embodiment, the bypass pipe opening-closing valve 29b is not used, and a check valve 29d that allows the refrigerant flowing through the bypass pipe 29a to flow toward the receive portion 286 from the three-way joint 43 is used as a control valve for controlling the flowing state of the refrigerant that flows through the bypass pipe 29a.

The supercool heat exchange portion 283b of the outdoor heat exchanger 28 is connected to one of the opening portions of the three-way joint 43. A basic configuration of the three-way joint 43 is the same as that of the first branch portion 22 and that of the first confluence portion 27 in the first embodiment. Furthermore, the other opening portions of the three-way joint 43 are connected to the bypass pipe 29a and one end of an electric expansion valve 44. A basic configuration of the electric expansion valve 44 is the same as that of the electric expansion valve 36 in the first embodiment.

Another end of the electric expansion valve 44 is connected to a first heat exchange portion 42a of the utilization side heat exchanger 42. The utilization side heat exchanger 42 includes the first heat exchange portion 42a and the second heat exchange portion 42b, which are provided in the room and connected in series. The utilization side heat exchanger 42 is a heat exchanger for exchanging heat between the refrigerant flowing through the utilization side heat exchanger 42 and the indoor blowing air sent by a blower fan 42c.

The first heat exchange portion 42a and the second heat exchange portion 42b are provided in series with respect to the flow direction of air blown into the room such that the indoor blowing air flows through the first heat exchange portion 42a and the second heat exchange portion 42b in this order. That is, the first heat exchange portion 42a is provided on the windward side of the flow direction of the indoor blowing air and the second heat exchange portion 42b is provided on the leeward side of the flow direction of the indoor blowing air.

An electric expansion valve 45 having a full open function is provided between the first heat exchange portion 42a and the second heat exchange portion 42b in the refrigerant flow. Although a basic configuration of the electric expansion valve 45 is the same as that of the electric expansion valve 44, the electric expansion valve 45 does not function as a depressurizing portion and functions just as a refrigerant passage in the full open state.

An output side of the control device of the present embodiment is connected to the electric motor 21b of the compressor 21, the electric expansion valves 44, 45, the electric four-way valve 41 and the like. The control device controls operations of the components. In contrast, an input side of the control device is connected to an operation panel, in which an actuation switch of the refrigerant cycle device 2, a selection switch of the cooling operation mode, the dehumidification operation mode and the heating operation mode, a room temperature setting switch of the room temperature, and the like are also provided other than various sensors for controlling an air conditioner.

Next, the operation of the present embodiment in the above configuration will be described. As described above, in the refrigerant cycle device 2 of the present embodiment, the three operation modes, i.e., the cooling operation mode for cooling the indoor blowing air, the dehumidification operation mode for dehumidifying and heating the indoor blowing air and the heating operation mode for heating the indoor blowing air, can be selectively switched.

A. Cooling Operation Mode

When the cooling operation mode is selected by the selection switch in the state where the actuation switch of the refrigerant cycle device 2 in the operation panel is turned on, the cooling operation mode is performed. In the cooling operation mode, the control device switches the electric four-way valve 41 such that the discharge side of the compressor 21 is connected to the condensation heat exchange portion 283a of the outdoor heat exchanger 28 and the second heat exchange portion 42b of the utilization side heat exchanger 42 is connected to the accumulator 34 at the same time.

Therefore, all of the refrigerant flowing into the receive portion 286 from the compressor 21 via the condensation heat exchange portion 283a flows into the supercool heat exchange portion 283b by the operation of the check valve 29d. Furthermore, the control device causes the electric expansion valve 44 to be in the throttle state, causes the electric expansion valve 45 to be in the full open state, and rotates the electric motor 21b of the compressor 21.

Thereby, as shown in the solid arrows in FIG. 4, the vapor compression refrigerant cycle is configured such that the refrigerant circulates through the compressor 21, the electric four-way valve 41, the condensation heat exchange portion 283a of the outdoor heat exchanger 28, the receive portion 286, the supercool heat exchange portion 283b, the three-way joint 43, the electric expansion valve 44, the first heat exchange portion 42a of the utilization side heat exchanger 42, the electric expansion valve 45, the second heat exchange portion 42b, the electric four-way valve 41, the accumulator 34 and the compressor 21 in this order.

Therefore, the refrigerant compressed by the compressor 21 is cooled by exchanging heat with the ambient air at the outdoor heat exchanger 28, and is depressurized and expanded by the electric expansion valve 44. Furthermore, the low pressure refrigerant depressurized by the electric expansion valve 44 flows into the first heat exchange portion 42a of the utilization side heat exchanger 42, and absorbs heat from the air blown by the blower fan 42c to evaporate. Thereby, the indoor blowing air is cooled.

Furthermore, the refrigerant flowing out of the first heat exchange portion 42a flows into the second heat exchange portion 42b, and absorbs heat from the indoor blowing air having been cooled by the first heat exchange portion 42a to evaporate. Thereby, the indoor blowing air is further cooled.

The refrigerant flowing out of the utilization side heat exchanger 42 flows into the accumulator 34 via the electric four-way valve 41. The gas phase refrigerant separated from the liquid phase refrigerant in the accumulator 34 is drawn into the compressor 21 and compressed again.

In the cooling operation mode of the present embodiment, the refrigerant passes through the condensation heat exchange portion 283a, the receive portion 286 and the supercool heat exchange portion 283b in this order while passing through the outdoor heat exchanger 28. Thereby, enthalpy of the refrigerant that flows into the utilization side heat exchanger 42 can be decreased and refrigeration capacity by the utilization side heat exchanger 42 can be increased. Therefore, COP can be improved.

B. Dehumidification Operation Mode

When the dehumidification operation mode is selected by the selection switch in the state where the actuation switch of the refrigerant cycle device 2 in the operation panel is turned on, the dehumidification operation mode is performed. In the dehumidification operation mode, the control device switches the electric four-way valve 41 such that the discharge side of the compressor 21 is connected to the second heat exchange portion 42b of the utilization side heat exchanger 42, and the condensation heat exchange portion 283a of the outdoor heat exchanger 28 is connected to the accumulator 34 at the same time.

Furthermore, the control device causes the electric expansion valve 44 and the electric expansion valve 45 to be in the throttle state and rotates the electric motor 21b of the compressor 21. Therefore, almost all of the refrigerant flowing out of the electric expansion valve 44 flows into the bypass pipe 29a of the refrigerant bypass device 29 that has a lower pressure loss than the supercool heat exchange portion 283b.

Thereby, as shown in the dashed arrows in FIG. 4, the vapor compression refrigerant cycle is configured such that the refrigerant circulates through the compressor 21, the electric four-way valve 41, the second heat exchange portion 42b of the utilization side heat exchanger 42, the electric expansion valve 45, the first heat exchange portion 42a, the electric expansion valve 44, the three-way joint 43, the bypass pipe 29a, the check valve 29d, the receive portion 286 of the outdoor heat exchanger 28, the condensation heat exchange portion 283a, the electric four-way valve 41, the accumulator 34 and the compressor 21 in this order.

Therefore, the refrigerant compressed by the compressor 21 exchanges heat with the indoor blowing air, which has passed through the first heat exchange portion 42a, at the second heat exchange portion 42b of the utilization side heat exchanger 42 to radiate heat. Thereby, the indoor blowing air is heated. The refrigerant flowing out of the second heat exchange portion 42b is depressurized and expanded by the electric expansion valve 45, flows into the heat exchange portion 42a, and absorbs heat from the air blown by the blower fan 44c to evaporate.

As described above, the first heat exchange portion 42a is provided on the windward side of the indoor blowing air with respect to the second heat exchange portion 42b. Thereby, the indoor blowing air is dehumidified at the first heat exchange portion 42a, and then, the indoor blowing air is heated at the second heat exchange portion 42b. Thereby, the dehumidification heating operation is performed.

Furthermore, the refrigerant flowing out of the first heat exchange portion 42a is further depressurized and expanded by the electric expansion valve 44, and flows into the receive portion 286 of the outdoor heat exchanger 28 from the three-way joint 43 via the bypass pipe 29a. The refrigerant flowing into the receive portion 286 absorbs heat from ambient air sent by the blower fan 28a at the condensation heat exchange portion 283a to further evaporate.

The refrigerant flowing out of the condensation heat exchange portion 283a flows into the accumulator 34 via the electric four-way valve 41. Moreover, the gas phase refrigerant separated from the liquid phase refrigerant in the accumulator 34 is drawn into the compressor 21 and compressed again.

In the dehumidification operation mode of the present embodiment, the refrigerant passes through the bypass pipe 29a, the receive portion 286 and the condensation heat exchange portion 283a in this order while passing through the outdoor heat exchanger 28. Thereby, pressure loss generated when the refrigerant passes through the outdoor heat exchanger 28 can be drastically decreased compared to the case where the refrigerant passes through the supercool heat exchange portion 283b, the receive portion 286 and the condensation heat exchange portion 283a in this order.

Thus, reduction of pressure of the refrigerant that is to be drawn into the compressor 21 can be suppressed, and power consumption of the compressor 21 can be reduced. Therefore, COP can be improved.

C. Heating Operation Mode

When the heating operation mode is selected by the selection switch in the state where the actuation switch of the refrigerant cycle device 2 in the operation panel is turned on, the heating operation mode is performed. In the heating operation mode, the control device switches the electric four-way valve 41 as the dehumidification operation mode. The control device causes the electric expansion valve 44 to be in the throttle state, causes the electric expansion valve 45 to be in the full open state, and rotates the electric motor 21b of the compressor 21.

Thereby, as shown in the dashed arrows in FIG. 4, the vapor compression refrigerant cycle, in which the refrigerant circulates as the dehumidification operation mode, is configured.

Therefore, the refrigerant compressed by the compressor 21 exchanges heat with the indoor blowing air at the second heat exchange portion 42b and the first heat exchange portion 42a of the utilization side heat exchanger 42 to radiate heat. Thereby, the indoor blowing air is heated. The refrigerant flowing out of the first heat exchange portion 42a flows as in the dehumidification operation mode, and is drawn into the compressor 21 and compressed again.

In the heating operation mode of the present embodiment, as in the dehumidification operation mode, the refrigerant passes through the bypass pipe 29a, the receive portion 286 and the condensation heat exchange portion 283a in this order. Thereby, reduction of pressure of the refrigerant that is to be drawn into the compressor 21 can be suppressed, and power consumption of the compressor 21 can be reduced. Therefore, COP can be improved.

The flow of the refrigerant in the outdoor heat exchanger 28 in respective operation modes will be described with reference to FIG. 5. In FIG. 5, a solid arrow shows the flow of the refrigerant in the cooling operation mode, and a dashed arrow shows the flow of the refrigerant in the dehumidification operation mode and the heating operation mode.

Figure 5:
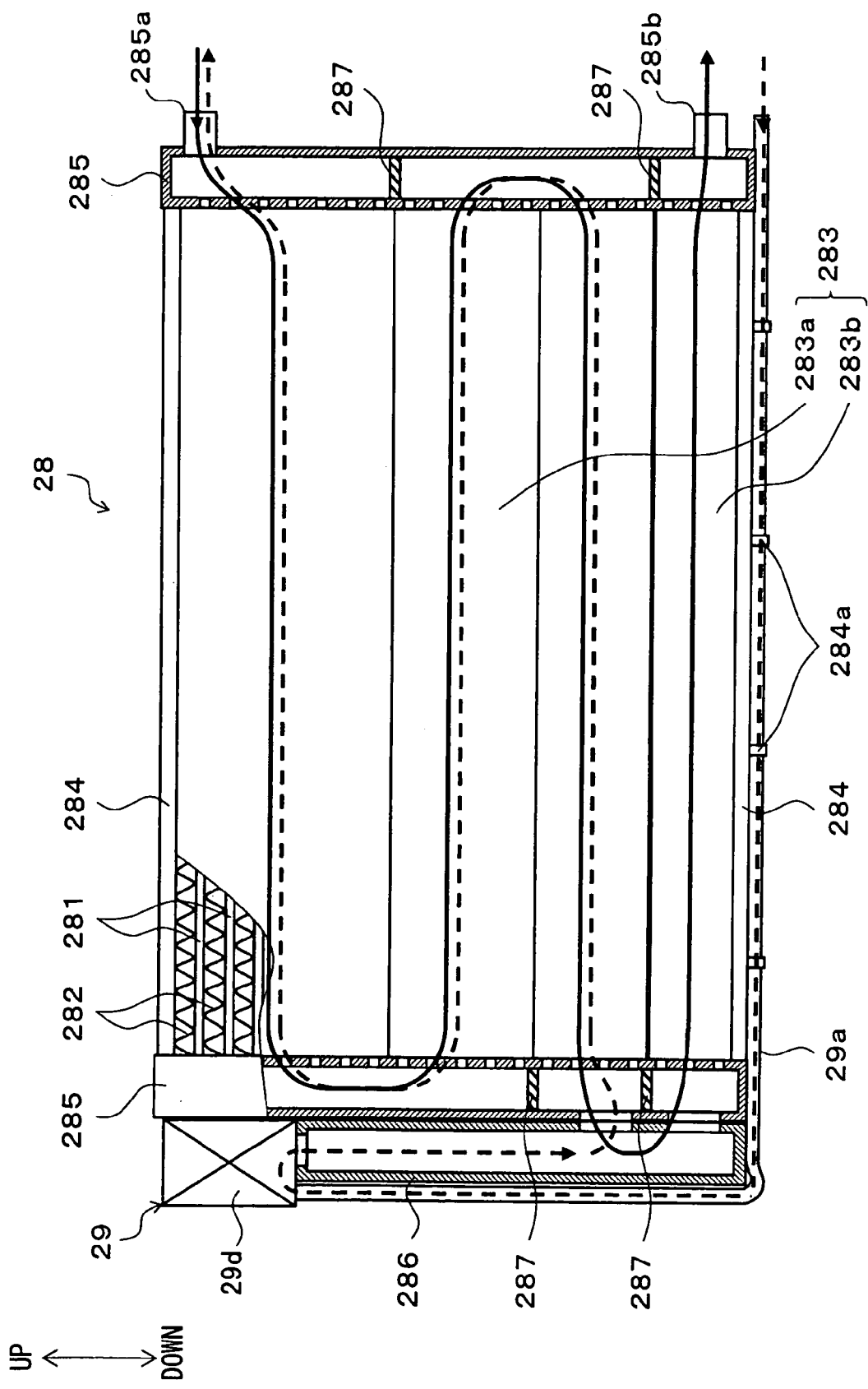
FIG. 5 is a cross-sectional view showing an outdoor heat exchanger according to the third embodiment.

As is clear from FIG. 5, in the present embodiment, the flow direction of the refrigerant flowing through the outdoor heat exchanger 28 in the cooling operation mode is opposite from the flow direction of the refrigerant flowing through the outdoor heat exchanger 28 in the dehumidification operation mode and the heating operation mode.

As described above, according to the present embodiment, the refrigerant cycle device is configured to be capable of switching the cooling operation mode and the heating operation mode. Moreover, in the refrigerant cycle device using the subcool condenser, even if the cycle configuration that the flow direction of the refrigerant flowing through the outdoor heat exchanger 28 in the cooling operation mode is opposite from the flow direction of the refrigerant flowing through the outdoor heat exchanger 28 in the heating operation mode is used, COP in both operation modes can be improved, and the similar effect with the first embodiment can be obtained.

Fourth Embodiment

Figure 6:
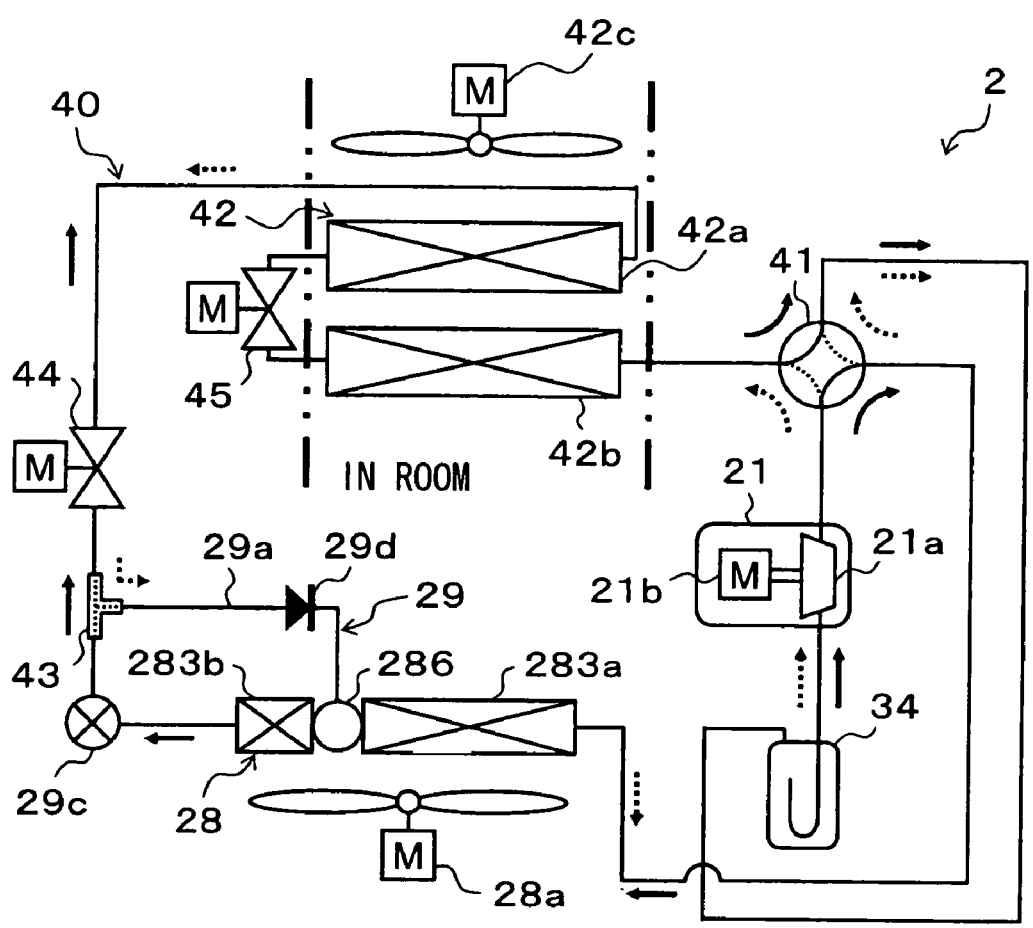
FIG. 6 is a schematic diagram showing a whole configuration of a refrigerant cycle device used as an air conditioner according to a fourth embodiment.

In the present embodiment, as shown in the whole configuration diagram of FIG. 6, the main pipe opening-closing valve 29c, which is the same with one in the second embodiment, as a control valve for the refrigerant bypass device 29 is added with respect to the refrigerant cycle device 2 of the third embodiment.

The main pipe opening-closing valve 29c is provided in a main pipe between an end portion of the bypass pipe 29a at a side of the three-way joint 43 and the supercool heat exchange portion 283b, that is, in the pipe connected between the three-way joint 43 and the supercool heat exchange portion 283b, and is a solenoid valve for opening and closing the main pipe. Furthermore, the operation of the main pipe opening-closing valve 29c is controlled by the control voltage output from the control device.

Moreover, the control device causes the main pipe opening-closing valve 29c to be opened in the cooling operation mode, and causes the main pipe opening-closing valve 29c to be closed in the dehumidification operation mode and the heating operation mode. Therefore, the operation of the refrigerant cycle 2 in the cooling operation mode becomes similar to that of the third embodiment.

In contrast, because the main pipe opening-closing valve 29c is closed in the dehumidification operation mode and the heating operation mode, all of the refrigerant flowing out of the electric expansion valve 44 flows into the bypass pipe 29a of the refrigerant bypass device 29.

Therefore, in the present embodiment, the similar effect with the third embodiment can be obtained. In addition, the refrigerant can be prevented absolutely from flowing into the supercool heat exchange portion 283b in the dehumidification operation mode and the heating operation mode. Thereby, the oil staying phenomenon or a lubricating defective of the compressor 21 can be prevented as the second embodiment.

Fifth Embodiment

Next, a fifth embodiment of the present invention will be described with reference to FIG. 7. In the present embodiment, a refrigerant cycle device 3 of the present invention is used for an air conditioning device for a vehicle such as an electric vehicle or a fuel-cell vehicle that has no engine for running the vehicle and a hybrid vehicle that stops the engine at the stoppage time.

Figure 7:
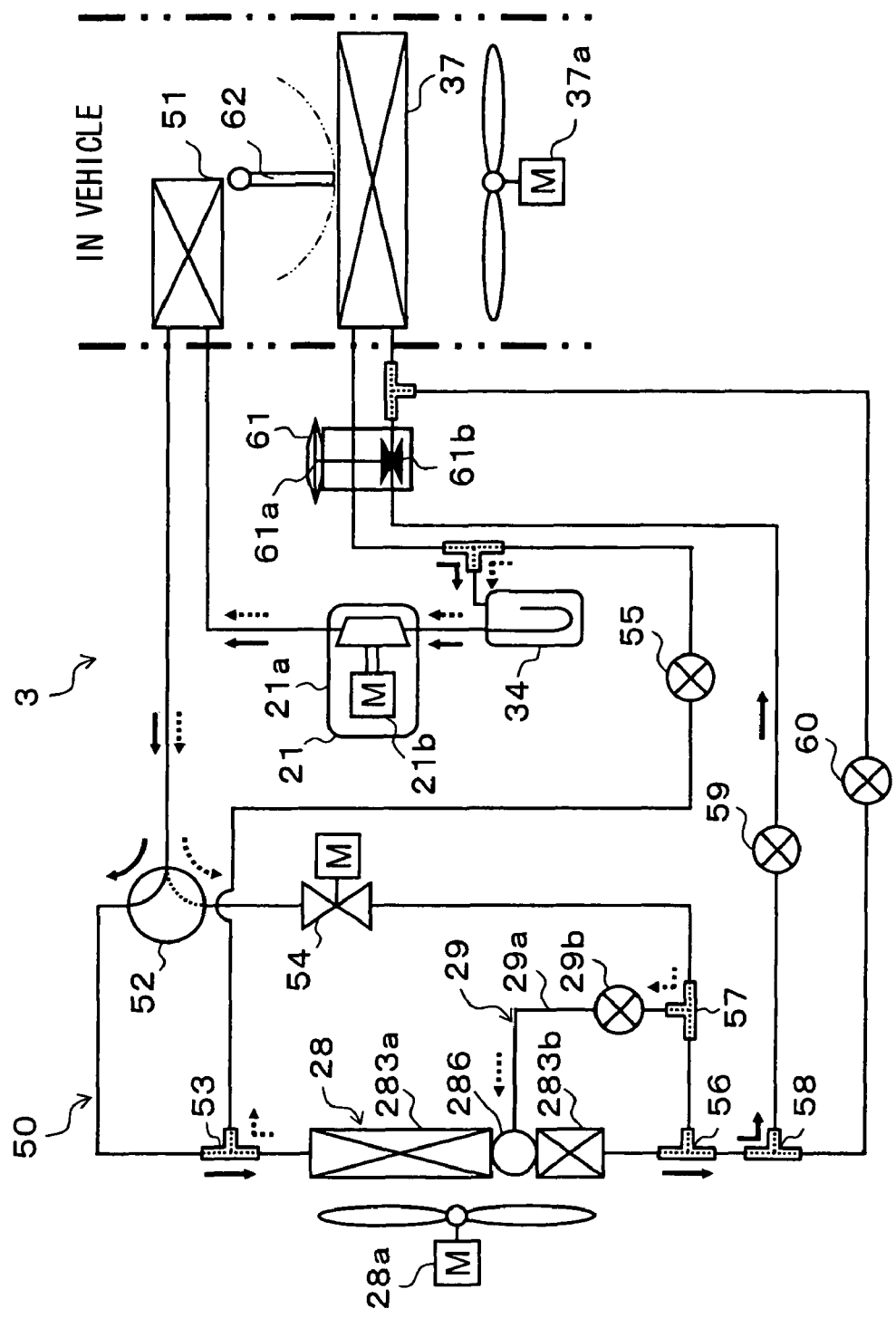
FIG. 7 is a schematic diagram showing a whole configuration of a refrigerant cycle device used as an air conditioner for a vehicle according to a fifth embodiment.

FIG. 7 is a schematic diagram showing a whole configuration of the refrigerant cycle device 3. In FIG. 7, solid arrows show a refrigerant flow in a cooling operation mode described below, and dashed arrows show the refrigerant flow in a heating operation mode described below.

The refrigerant cycle device 3 includes a vapor compression refrigerant cycle 50, which is configured to be capable of switching the cooling operation mode for cooling an indoor blowing air that is a fluid to be heat exchanged, and the heating operation mode for heating the indoor blowing air.

In the present embodiment, a refrigerant discharge side of the compressor 21 is connected to a radiator 51. The radiator 51 is provided in a vehicle, and is a utilization side heat exchanger for heating air to be blown into a vehicle compartment by exchanging heat between the refrigerant flowing through the inside of the radiator 51 and cooled air after passing through the evaporator 37. A refrigerant outlet side of the radiator 51 is connected to an electric three-way valve 52. The electric three-way valve 52 is a flow passage switch portion, and the operation of the electric three-way valve 52 is controlled by the control signals output from the control device.

Specifically, the electric three-way valve 52 selectively switches one of a refrigerant flow passage that connects an outlet of the radiator 51 to a first three-way joint 53, i.e., a flow circuit shown by the solid arrows in FIG. 7, and a refrigerant flow passage that connects the outlet of the radiator 51 to an electric expansion valve 54, i.e., a flow circuit shown by the dashed arrows in FIG. 7. Moreover, a basic configuration of the respective three-way joints of the present embodiment is the same as that of the first branch portion 22 of the first embodiment or the like, and a basic configuration of the electric expansion valve 54 is the same as that of the electric expansion valve 36 of the first embodiment.

Among the opening portions of the first three-way joint 53 other than the opening portion coupled to the radiator 51, one of the opening portions of the first three-way joint 53 is coupled to the accumulator 34 via a fourth solenoid valve 55 as a flow passage switch portion, and another one of the opening portions of the first three-way joint 53 is connected to the condensation heat exchange portion 283a of the outdoor heat exchanger 28. A basic configuration of the respective solenoid valves of the present embodiment is the same as those of the first solenoid valve 26, the second solenoid valve 33 and the third solenoid valve 35 of the first embodiment or the like. Moreover, the outdoor heat exchanger 28 of the present embodiment is connected to the refrigerant bypass device 29 that is similar to that of the third embodiment.

The supercool heat exchange portion 283b of the outdoor heat exchanger 28 is connected to a second three-way joint 56. One of the opening portions of the second three-way joint 56 is coupled to the bypass pipe 29a of the refrigerant bypass device 29 and the electric expansion valve 54 via a third three-way joint 57. Moreover, another one of the opening portions of the second three-way joint 56 is coupled to one end of a fifth solenoid valve 59 and one end of a sixth solenoid valve 60, which are flow passage switch portions, via a fourth three-way joint 58.

Another end of the fifth solenoid valve 59 is connected to the evaporator 37 via a thermal expansion valve 61. The thermal expansion valve 61 includes a temperature-sensitive portion 61a for detecting superheat degree of the refrigerant at an outlet side of the evaporator 37 based on the temperature and the pressure of the refrigerant at the outlet side of the evaporator 37, and a variable throttle mechanical portion 61b for adjusting a throttle passage area, i.e., a flow amount of the refrigerant, such that the superheat degree of the refrigerant at the outlet side of the evaporator 37 is within a predetermined range. The thermal expansion valve 61 is a well-known internal pressure equalizing expansion valve having the temperature-sensitive portion 61a and the variable throttle mechanical portion 61b in one housing.

Another end of the sixth solenoid valve 60 is connected to the evaporator 37. The outlet side of the evaporator 37 is connected to the accumulator 34 via the temperature-sensitive portion 61a of the thermal expansion valve 61.

Furthermore, in the present embodiment, an air mix door 62 is provided downstream of the air flow of the evaporator 37, which is provided in the vehicle compartment, and upstream of the air flow of the radiator 51. The air mix door 62 is a door portion for changing the air flow ratio that passes through the radiator 51 among the air cooled by the evaporator 37. By changing the opening degree of the air mix door 62, the temperature of the air to be blown into the vehicle compartment is adjusted.

The air mix door 62 is driven by an actuator for driving, which is not shown in the drawing. The rotational position, that is, the opening degree of the air mix door 62 can be continuously adjusted. The operation of the air mix door 62 is controlled by the control signals output from the control device.

Moreover, an output side of the control device of the present embodiment is connected to the electric motor 21b of the compressor 21, the bypass pipe opening-closing valve 29b, the electric three-way valve 52, the electric expansion valve 54, the fourth solenoid valve 55, the fifth solenoid valve 59, the sixth solenoid valve 60, the actuator for driving of the air mix door 62 and the like. The control device controls operations of the components.

In contrast, an input side of the control device is connected to an operation panel, in which an actuation switch of the refrigerant cycle device 3, a selection switch of the cooling operation mode and the heating operation mode, a vehicle interior temperature setting switch and the like are provided, in addition to various sensors for controlling an air conditioner.

Next, the operation of the present embodiment in the above configuration will be described. As described above, in the refrigerant cycle device 3 of the present embodiment, the cooling operation mode for cooling the indoor blowing air and the heating operation mode for heating the indoor blowing air can be switched.

A. Cooling Operation Mode

When the cooling operation mode is selected by the selection switch in the state where the actuation switch of the refrigerant cycle device 3 in the operation panel is turned on, the cooling operation mode is performed. In the cooling operation mode, the control device switches the three-way valve 52 such that the outlet side of the radiator 51 is connected to the first three-way joint 53, closes the bypass pipe opening-closing valve 29b, the fourth solenoid valve 55 and the sixth solenoid valve 60, and opens the fifth solenoid valve 59.

Therefore, all of the refrigerant flowing into the first three-way joint 53 flows into the condensation heat exchange portion 283a of the outdoor heat exchanger 28. Furthermore, the control device rotates the electric motor 21b of the compressor 21, and outputs the control signals to the actuator for driving of the air mix door 62 such that the temperature of the indoor blowing air approaches the setting temperature set by the vehicle interior temperature setting switch.

Thereby, as shown in the solid arrows in FIG. 7, the vapor compression refrigerant cycle is configured such that the refrigerant circulates through the compressor 21, the radiator 51, the electric three-way valve 52, the first three-way joint 53, the condensation heat exchange portion 283a of the outdoor heat exchanger 28, the receive portion 286, the supercool heat exchange portion 283b, the second three-way joint 56, the fourth three-way joint 58, the fifth solenoid valve 59, the thermal expansion valve 61, the evaporator 37, the temperature-sensitive portion 61a of the thermal expansion valve 61, the accumulator 34 and the compressor 21 in this order.

Therefore, the refrigerant compressed by the compressor 21 is cooled at the radiator 51 by exchanging heat with the indoor blowing air that is cooled by passing through the evaporator 37, is further cooled by exchanging heat at the outdoor heat exchanger 28 with the ambient air, and is depressurized and expanded by the thermal expansion valve 61. The low pressure refrigerant depressurized by the thermal expansion valve 61 flows into the evaporator 37, and absorbs heat from the indoor blowing air sent by the blower fan 37a to evaporate.

In this case, as described above, because the opening degree of the air mix door 62 is adjusted, a part of the indoor blowing air that is cooled by the evaporator 37 is heated by the radiator 51 so that the temperature adjustment of the indoor blowing air is performed. Furthermore, the refrigerant flowing out of the evaporator 37 flows into the accumulator 34 via the temperature-sensitive portion 61a of the thermal expansion valve 61. The gas phase refrigerant separated from the liquid phase refrigerant by the accumulator 34 is drawn into the compressor 21 and compressed again.

In the cooling operation mode of the present embodiment, the refrigerant can pass through the condensation heat exchange portion 283a, the receive portion 286 and the supercool heat exchange portion 283b in this order while passing through the outdoor heat exchanger 28. Thereby, enthalpy of the refrigerant that flows into the evaporator 37 can be decreased and refrigeration capacity by the evaporator 37 can be increased. Therefore, COP can be improved.

B. Heating Operation Mode

When the heating operation mode is selected by the selection switch in the state where the actuation switch of the refrigerant cycle device 3 in the operation panel is turned on, the heating operation mode is performed. In the heating operation mode, the control device switches the three-way valve 52 such that the refrigerant outlet side of the radiator 51 is connected to the electric expansion valve 54, opens the bypass pipe opening-closing valve 29b and the fourth solenoid valve 55, and closes the fifth solenoid valve 59 and the sixth solenoid valve 60.

Furthermore, the control device causes the electric expansion valve 54 to be in the throttle state and rotates the electric motor 21b of the compressor 21. Therefore, almost all of the refrigerant flowing into the third three-way joint 57 flows into the bypass pipe 29a of the refrigerant bypass device 29 that has a lower pressure loss than the supercool heat exchange portion 283b.

Thereby, as shown in the dashed arrows in FIG. 7, the vapor compression refrigerant cycle is configured such that the refrigerant circulates through the compressor 21, the radiator 51, the electric three-way valve 52, the electric expansion valve 54, the third three-way valve 57, the bypass pipe 29a, the receive portion 286 of the outdoor heat exchanger 28, the condensation heat exchange portion 283a, the first three-way joint 53, the fourth solenoid valve 55, the accumulator 34 and the compressor 21 in this order.

Therefore, the refrigerant compressed by the compressor 21 exchanges heat with the indoor blowing air at the radiator 51. Thereby, the indoor blowing air is heated. The refrigerant flowing out of the radiator 51 is depressurized and expanded by the electric expansion valve 54 and flows into the receive portion 286 of the outdoor heat exchanger 28. The refrigerant flowing into the receive portion 286 absorbs heat from the ambient air sent by the blower fan 28a at the condensation heat exchange portion 283a to evaporate.

The refrigerant flowing out of the condensation heat exchange portion 283a flows into the accumulator 34 via the first three-way joint 53 and the fourth solenoid valve 55.

Furthermore, the gas phase refrigerant separated from the liquid phase refrigerant in the accumulator is drawn into the compressor 21 and compressed again.

In the heating operation mode of the present embodiment, the refrigerant passes through the bypass pipe 29a, the receive portion 286 and the condensation heat exchange portion 283a in this order while passing through the outdoor heat exchanger 28. Thereby, pressure loss generated when the refrigerant passes through the outdoor heat exchanger 28 can be drastically decreased compared to the case where the refrigerant passes through the supercool heat exchange portion 283b, the receive portion 286 and the condensation heat exchange portion 283a in this order.

Thus, reduction of pressure of the refrigerant that is to be drawn into the compressor 21 can be suppressed, and power consumption of the compressor 21 can be reduced. Therefore, COP can be improved.

As described above, according to the present embodiment, the refrigerant cycle device is configured to be capable of switching the cooling operation mode and the heating operation mode. Moreover, in the refrigerant cycle device using the subcool condenser, even if the cycle configuration that the flow direction of the refrigerant flowing through the outdoor heat exchanger 28 in the cooling operation mode is opposite from the flow direction of the refrigerant flowing through the outdoor heat exchanger 28 in the heating operation mode is used, COP in both operation modes can be improved, and the same effect with the first embodiment can be obtained.

In the cooling operation mode and the heating operation mode described above, although the sixth solenoid valve 60 is not opened, the sixth solenoid valve 60 is opened in a dehumidification heating operation.

The dehumidification heating operation is performed in the above-described cooling operation mode. However, generally, the ambient temperature is low in the dehumidification heating operation. Thereby, the temperature-sensitive portion 61a of the thermal expansion valve 61 may detect lower superheat degree than the actual superheat degree of the refrigerant flowing out of the evaporator 37 because of influence of the ambient temperature. Therefore, the variable throttle mechanical portion 61b may be totally closed and the refrigerant may not be supplied to the evaporator 37.

The superheat degree of the refrigerant flowing out of the evaporator 37 is increased forcibly by opening the sixth solenoid valve 60 in a time set in advance so that the temperature of the temperature-sensitive portion 61a itself is increased. Thereby, the temperature-sensitive portion 61a is prevented from being influenced by the ambient temperature, and the thermal expansion valve 61 is operated normally, when the dehumidification heating operation is performed.

Other Embodiments

The present invention is not limited to the above embodiments, and can be modified variously as follows.

(1) The application of the refrigerant cycle device of the present invention is not limited to the cycle configuration described in the above embodiments, and can be used for various cycle configurations. For example, the refrigerant cycle device of the present invention can be used for the test refrigerant cycle device.

(2) In the above second embodiment, the example that two opening-closing valves such as the bypass pipe opening-closing valve 29b and the main pipe opening-closing valve 29c, are used as the control valve of the refrigerant bypass device 29 is described. However, the control valve of the refrigerant bypass device 29 is not limited to this.

For example, the bypass pipe opening-closing valve 29b, the main pipe opening-closing valve 29c and the second confluence portion 32 of the second embodiment may not be used, and an electric three-way valve having the same configuration with the electric three-way valve 52 of the fifth embodiment may be provided at a portion at which the second confluence portion 32 is provided in the second embodiment. Similarly, the check valve 29d, the main pipe opening-closing valve 29c and the three-way joint 43 of the above fourth embodiment may not be used, and an electric three-way valve may be provided at a portion at which the three-way joint 43 is provided in the fourth embodiment.

(3) In the above fifth embodiment, the example that the bypass pipe opening-closing valve 29b is used as the control valve of the refrigerant bypass device 29 is described. However, the bypass pipe opening-closing valve 29b may not be used and the check valve 29d that is similar to the third embodiment may be used.

Furthermore, if the main pipe opening-closing valve 29c is added as in the second embodiment and the fourth embodiment, the refrigerant can be prevented absolutely from flowing into the supercool heat exchange portion 283b in the heating operation mode and the oil staying phenomenon or a lubricating defective of the compressor 21 can be prevented.

(4) In the above embodiments, the example that the refrigerant flows in the refrigerant bypass portion 29 such that the refrigerant bypasses the whole supercool heat exchange portion 283b in the heating operation mode is described. However, the refrigerant may bypass a part of the supercool heat exchange portion 283b. In this case, the bypass pipe 29a is connected to midstream of the supercool heat exchange portion 283b.

(5) In the above embodiments, the example that the bypass pipe 29a is fixed at the bottom surface side of the supercool heat exchange portion 283b so that the outdoor heat exchanger 28 and the refrigerant bypass device 29 are configured integrally is described. However, the integration of the outdoor heat exchanger 28 and the refrigerant bypass device 29 is not limited to this.

Figure 8:
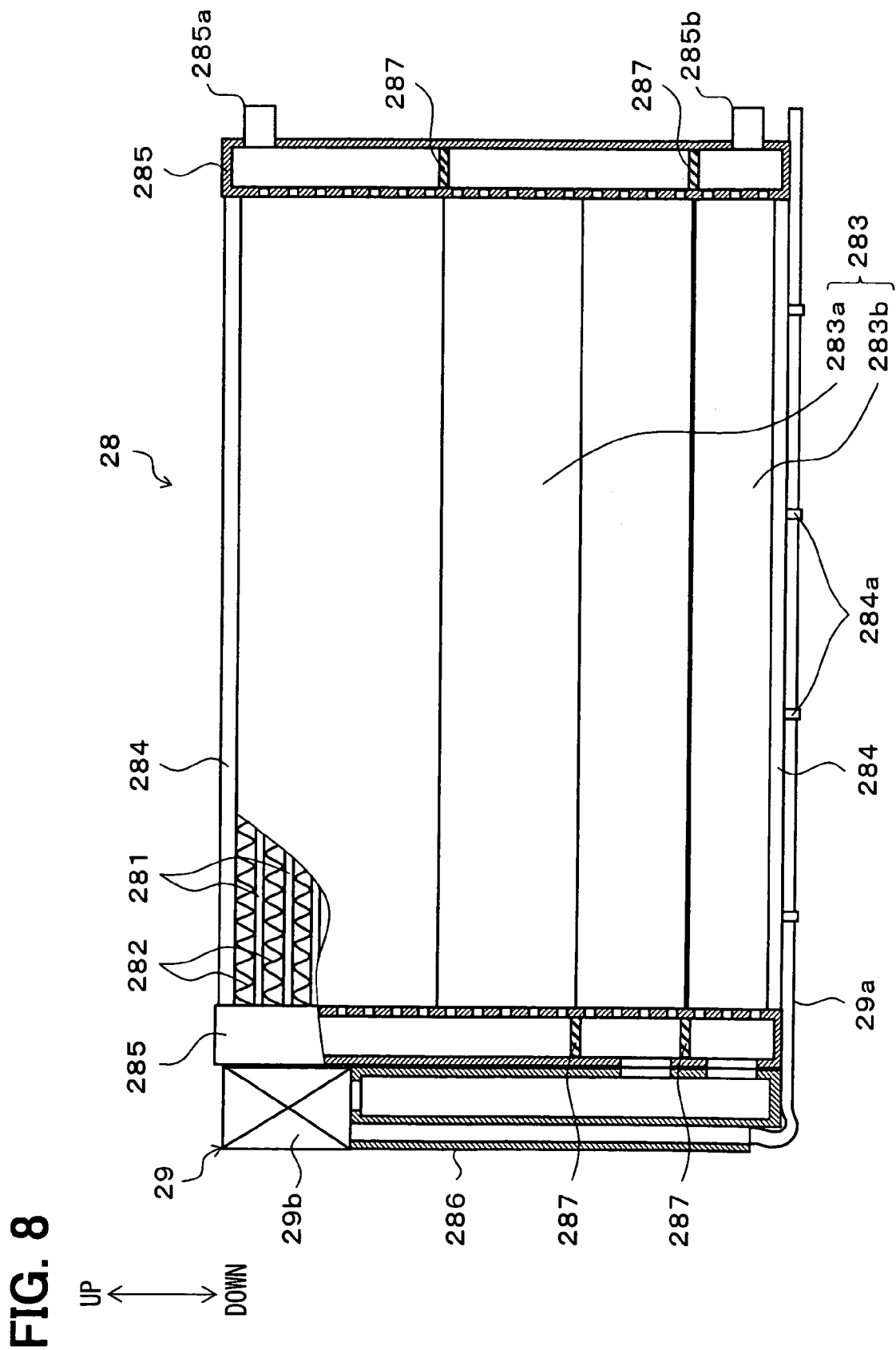
FIG. 8 is a cross-sectional view showing an outdoor heat exchanger according to other embodiments.
Figure 9:
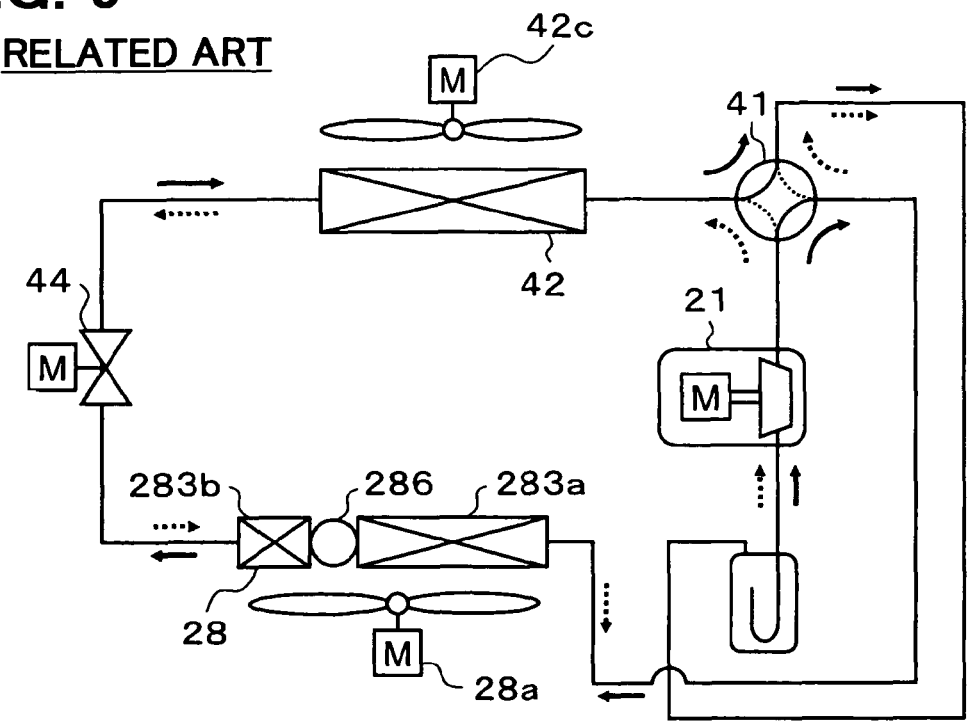
FIG. 9 is a schematic diagram showing a whole configuration of a refrigerant cycle device for reviewing.
Figure 10:
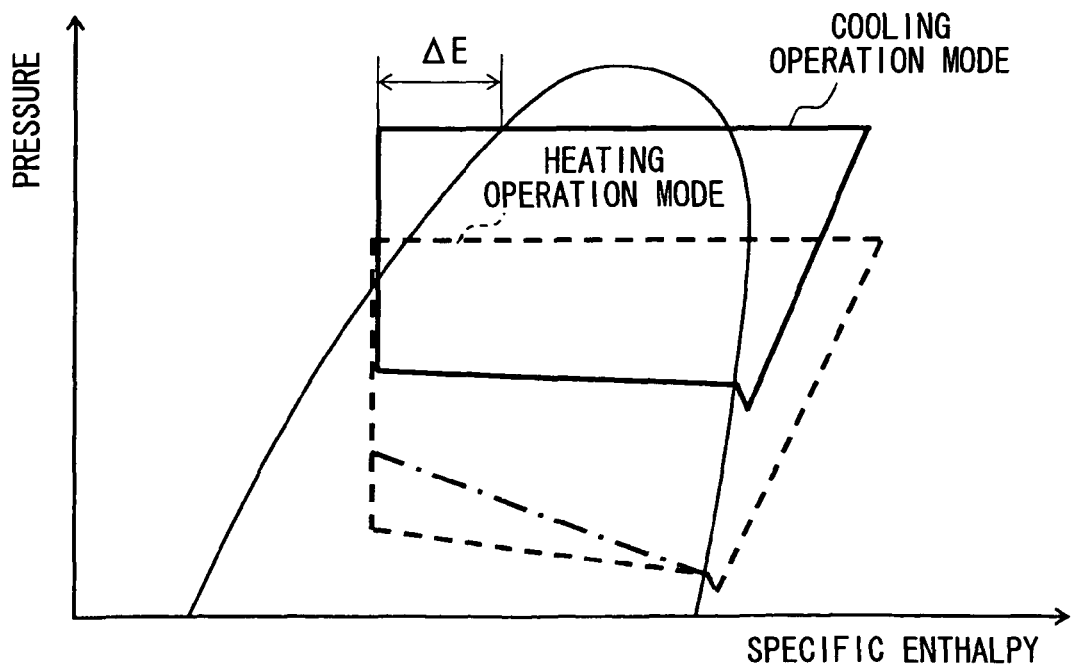
FIG. 10 is Mollier diagram showing a state of a refrigerant of the refrigerant cycle device for reviewing.

For example, as shown in FIG. 8, through holes are provided in a body portion configuring an outer shell of the receive portion 286 that is a configuring member of the outdoor heat exchanger 28, and the body portion having the through holes is used as a part of the bypass pipe 29a. Thereby, miniaturization and mounting capability of the outdoor heat exchanger 28 and the refrigerant bypass device 29 can be improved. In addition, the temperature change of the refrigerant passing through the bypass pipe 29a is suppressed and the pressure loss due to the volume expansion of the refrigerant passing through the bypass pipe 29a can be reduced.

(6) Although the example that the electric compressor is used is described in the above embodiments, the compressor is not limited to this. For example, a compressor to which driving force is transmitted from the engine may be used. Furthermore, a variable capacity compressor that can adjust the refrigerant discharge ability based on the change of the discharge amount may be used.

(7) Although the example that the ordinary fluorocarbon refrigerant is used as the refrigerant is described in the above embodiment, the kind of the refrigerant is not limited to this. For example, hydrocarbon refrigerant and the like may be used, provided that the cycle is configured such that the refrigerant is condensed at the high pressure side of the cycle.

(8) Although the example that the refrigerant cycle device of the present invention is used for the air-conditioning water heater, the air conditioner and the like is described, the application of the refrigerant cycle device of the present invention is not limited to this. For example, the present invention may be applied to refrigerant cycle devices such as an industrial refrigeration device, a refrigeration device for vending machines, a refrigerated showcase and the like.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A refrigerant cycle device comprising:
   a compressor configured to compress and discharge a refrigerant;
   first and second utilization side heat exchangers, each utilization side heat exchanger configured to exchange heat between the refrigerant and a fluid to be heat exchanged;
   an outdoor heat exchanger configured to exchange heat between the refrigerant and ambient air; and
   a flow passage switch portion configured to switch a refrigerant flow passage, wherein
   the flow passage switch portion switches to a refrigerant flow passage, in which heat of the refrigerant discharged from the compressor is radiated by the outdoor heat exchanger while the refrigerant discharged from the compressor bypasses the first utilization side heat exchanger, and the refrigerant evaporated by the second utilization side heat exchanger flows into a refrigerant suction side of the compressor in a cooling operation mode for cooling the fluid, and switches to a refrigerant flow passage in which heat of the refrigerant discharged from the compressor is radiated by the first utilization side heat exchanger and the refrigerant evaporated by the outdoor heat exchanger flows into the refrigerant suction side of the compressor via a refrigerant bypass portion which bypasses the second utilization side heat exchanger in a heating operation mode for heating the fluid,
   the outdoor heat exchanger is configured to include a condensation heat exchange portion for condensing the refrigerant, a receive portion for separating the refrigerant flowing out of the condensation heat exchange portion into gas and liquid, and a supercool heat exchange portion for supercooling a saturated liquid phase refrigerant flowing out of the receive portion, the refrigerant flows through the supercool heat exchange portion to the second utilization side heat exchanger in the cooling operation mode,
   the refrigerant bypass portion is configured such that the refrigerant flowing into the receive portion from the condensation heat exchange portion flows out of the receive portion and through the refrigerant bypass portion while bypassing the supercool heat exchange portion in the heating operation mode,
   a refrigerant passage area of the outdoor heat exchanger is decreased in stepwise from an inlet portion toward an outlet portion of the outdoor heat exchanger, and
   the refrigerant bypass portion communicates with the receive portion at a first communication portion, the receive portion communicates with the supercool heat exchange portion at a second communication portion, and the first communication portion is located at a position higher than the second communication portion.

2. The refrigerant cycle device according to claim 1, wherein
   a flow direction of the refrigerant flowing through the outdoor heat exchanger in the cooling operation mode is the same with a flow direction of the refrigerant flowing through the outdoor heat exchanger in the heating operation mode.

3. The refrigerant cycle device according to claim 2, wherein
   the refrigerant bypass portion includes a bypass pipe through which the refrigerant flowing out of the receive portion flows, and a control valve for controlling a flowing state of the refrigerant flowing through the bypass pipe.

4. The refrigerant cycle device according to claim 3, wherein
   the control valve includes a bypass pipe opening-closing valve for opening and closing the bypass pipe.

5. The refrigerant cycle device according to claim 4, wherein
   the control valve further includes a main pipe opening-closing valve for opening and closing a main pipe, and the main pipe opening-closing valve is provided in the main pipe between an end portion of the bypass pipe that is opposite from another end portion thereof connected to the receive portion and the supercool heat exchange portion.

6. The refrigerant cycle device according to claim 1, wherein
   at least a part of the refrigerant bypass portion is provided along an outer surface of the outdoor heat exchanger.

7. The refrigerant cycle device according to claim 1, wherein
   at least a part of the refrigerant bypass portion is configured integrally with a configuring member of the outdoor heat exchanger.

8. The refrigerant cycle device according to claim 1, wherein
   at least a part of the refrigerant bypass portion is configured integrally with the outdoor heat exchanger such that a temperature change of the refrigerant passing through the refrigerant bypass portion is suppressed.

* * * * *